United States Patent
Terada et al.

(10) Patent No.: US 7,397,744 B2
(45) Date of Patent: Jul. 8, 2008

(54) RECORDING AND/OR REPRODUCING METHOD AND APPARATUS

(75) Inventors: Mitsutoshi Terada, Kanagawa (JP);
Shoei Kobayashi, Kanagawa (JP);
Tomotaka Kuraoka, Tokyo (JP)

(73) Assignee: Sony Corporation, Tokyo (JP)

( * ) Notice: Subject to any disclaimer, the term of this patent is extended or adjusted under 35 U.S.C. 154(b) by 256 days.

(21) Appl. No.: 10/524,521

(22) PCT Filed: Jun. 14, 2004

(86) PCT No.: PCT/JP2004/008646

§ 371 (c)(1),
(2), (4) Date: Apr. 24, 2006

(87) PCT Pub. No.: WO2004/112025

PCT Pub. Date: Dec. 23, 2004

(65) Prior Publication Data

US 2006/0233078 A1    Oct. 19, 2006

(30) Foreign Application Priority Data

Jun. 13, 2003    (JP)    ............................. 2003-168876

(51) Int. Cl.
*G11B 5/09*    (2006.01)

(52) U.S. Cl. ................ 369/53.2; 369/53.24; 369/53.41; 369/47.1

(58) Field of Classification Search ....................... None
See application file for complete search history.

(56) References Cited

U.S. PATENT DOCUMENTS 7,031,239 B2*    4/2006    Takahashi et al. ........ 369/47.14

(Continued)

FOREIGN PATENT DOCUMENTS

EP    0 933 761 A2    8/1999

(Continued)

OTHER PUBLICATIONS

U.S. Appl. No. 11/560,249, filed Nov. 15, 2006, Terada et al.

*Primary Examiner*—Muhammad Edun
(74) *Attorney, Agent, or Firm*—Oblon, Spivak, McClelland, Maier & Neustadt, P.C.

(57) ABSTRACT

In a write-once recording medium, an optimum updating of the management information and a simple matching processing are to be achieved. To this end, in a system of a write-once medium, rendered accessible at random by employing the write/non-write indicating information, the management information, including a space bitmap and the last recording position information (LRA) indicating the last position of the recorded user data, is updated on the disc responsive to the generation or extinction of a gap (unrecorded area) in a region ahead of the LRA. The state of matching between the management information on the disc and the recording state of the user data is confirmed, responsive to the updating of the management information on the disc by the generation or extinction of the gap in the management information, by detecting whether or not the gap in the management information (gap indicated by the space bitmap) or the LRA is coincident with the gap or the LRA on the actual disc. Lacking the matching, the management information is updated to match the space bitmap or the LRA.

8 Claims, 23 Drawing Sheets

U.S. PATENT DOCUMENTS

2002/0021635 A1 2/2002 Park et al.
2006/0053249 A1* 3/2006 Yamaki et al. .............. 711/112
2006/0233078 A1 10/2006 Terada et al.

FOREIGN PATENT DOCUMENTS

| EP | 1 139 345 A2 | 10/2001 |
| JP | 2001-283438 | 10/2001 |
| JP | 2002-245752 | 8/2002 |
| JP | 2002-312942 | 10/2002 |

* cited by examiner

DMA

| Cluster Number | Contents | Number of Clusters |
|---|---|---|
| 1 – 4 | DDS(Same contents are repeated four times) | 4 |
| 5 – 8 | DFL#1 | 4 |
| 9 – 12 | DFL#2 (Same contents as #1) | 4 |
| 13 – 16 | DFL#3 (Same contents as #1) | 4 |
| 17 – 20 | DFL#4 (Same contents as #1) | 4 |
| 21 – 24 | DFL#5 (Same contents as #1) | 4 |
| 25 – 28 | DFL#6 (Same contents as #1) | 4 |
| 29 – 32 | DFL#7 (Same contents as #1) | 4 |

32 Clusters

FIG.4

DDS(Disc Definition Structure)

| Byte Position | Contents | Number of Bytes |
|---|---|---|
| 0 | DDS ID = "DS" | 2 |
| 2 | DDS Form Number | 1 |
| 3 | Reserved(00h) | 1 |
| 4 | Number of Times of DDS Update (=Serial Number of Last TDDS) | 4 |
| 8 | Reserved(00h) | 8 |
| 16 | Reserved(00h) | 4 |
| 20 | Reserved(00h) | 4 |
| 24 | Defect list Start Physical Sector Address (AD_DFL) in DMA | 4 |
| 28 | Reserved(00h) | 4 |
| 32 | User Data Area Start Physical Sector Address | 4 |
| 36 | User Data Area End Logical Sector Address. | 4 |
| 40 | Size of Inner Rim Side Exchange Area (ISA) | 4 |
| 44 | Size of Outer Rim Side Exchange Area (OSA) | 4 |
| 48 | Reserved(00h) | 4 |
| 52 | Exchange Area Usable Flag | 1 |
| 53 | Reserved(00h) | 65483 |

One Sector (65536 bytes)

FIG.5

DFL(Defect List)

| Byte Position | Contents | Number of Bytes |
|---|---|---|
| 0 | Defect List Management Information | 64 |
| 64 | Exchange Address Information ati#1 | 8 |
| 72 | Exchange Address Information ati#2 | 8 |
| | ... | |
| | Exchange Address Information ati#N | 8 |
| 64+8 × N | Terminal End of Exchange Address Information | 8 |
| | 00h | |
| | | |
| | 00h | |

4 Clusters

FIG.6

DFL/TDFL Defect List Management Information

| Byte Position | Contents | Number of Bytes |
|---|---|---|
| 0 | DFL ID = "DL" | 2 |
| 2 | DFL Form Number | 1 |
| 3 | Reserved 00h | 1 |
| 4 | Number of Times of DFL Update | 4 |
| 8 | Reserved 00h | 4 |
| 12 | Number of Registered DFL (N_DFL) | 4 |
| 16 | Reserved 00h | 8 |
| 24 | Number of Unrecorded Clusters of ISA/OSA | 4 |
| 28 | Reserved 00h | 36 |

64 Bytes

FIG.7

DFL/TDFL Exchange Address Information ati

| Bit b63···b60 | b59···b32 | b31···b28 | b27···b0 |
|---|---|---|---|
| Status 1 | Leading Physical Sector Address of Exchange Source (Defective) Sector | Reserved (0000) | Leading Physical Sector Address of Exchange Destination Sector |

← 8 Bytes →

[Status 1]
0000·····Usual Exchange
0101·····Burst Transfer Start Address
1010·····Burst Transfer End Address
The values other than those given above are reserved

Temporary DMA (TDMA)

| Cluster Number | Contents | Number of Clusters |
|---|---|---|
| 1 | Space Bitmap | 1 |
| 2 | Temporary Defect List (TDFL) | 1~4 |
| | | |
| | | |
| 2048 | | |

2048 Clusters

| Sector | Byte Position | Contents | | | Number of Bytes |
|---|---|---|---|---|---|
| 0 | 0 | Space Bitmap Identifier = "UB" | | | 2 |
| | 2 | Format Version = 00h | | | 1 |
| | 3 | Reserved, 00h | | | 1 |
| | 4 | Layer Number (0or1) | | | 4 |
| | 8 | Reserved, 00h | | | 8 |
| | 16 | Bitmap Information | Start Cluster First PSN | | 4 |
| | 20 | | Bitmap Data Start Byte Position*1 | | 4 |
| | 24 | | Validate Bit Length in Bitmap data | | 4 |
| | 28 | | Reserved,00h | | 36 |
| | 64 | Reserved, 00h | | | 1984 |
| 1 | 0 | Bitmap data | | | 2048 |
| 2 | 0 | Bitmap data | | | 2048 |
| N | 0 | Bitmap data | (0 < N < 31) | | M |
| N | M | Reserved, 00h | (0 ≦ M ≦ 2048) | | 2048-M |
| N+1 | 0 | Reserved, 00h | | | 2048 |
| 31 | 0 | Reserved, for Temporary DDS | | | 2048 |

Space Bitmap Information

*1 "Space Bitmap Identifier" Field Relative Address from

FIG. 10

TDFL (Temporary Defect List)

| Byte Position | Contents | Number of Bytes |
|---|---|---|
| 0 | Defect List Management Information | 64 |
| 64 | Exchange Address Information ati#1 | 8 |
| 72 | Exchange Address Information ati#2 | 8 |
| ... | ... | ... |
| 64+8×N | Exchange Address Information ati#N | 8 |
| | Terminal End of Exchange Address Information | 8 |
| | 00h | |
| 65536×N−2048 | Temporary DDS (TDDS) | 2048 |

1 to 4 Clusters

FIG.11

TDDS(Temporary Disc Definition Structure)

| Byte Position | Contents | Number of Bytes |
|---|---|---|
| 0 | DDS ID = "DC" | 2 |
| 2 | DDS Form Number | 1 |
| 3 | Reserved (00h) | 1 |
| 4 | TDDS Serial Number | 4 |
| 8 | Reserved (00h) | 8 |
| 16 | Reserved (00h) | 4 |
| 20 | Reserved (00h) | 4 |
| 24 | Temporary Defect List Start Physical Sector Address (AD_DFL) in TDMA | 4 |
| 28 | Reserved (00h) | 4 |
| 32 | User Data Area Start Physical Address | 4 |
| 36 | User Data Area End Logical Address | 4 |
| 40 | Size of Inner Rim Side Exchange Area (ISA) | 4 |
| 44 | Size of Outer Rim Side Exchange Area (OSA) | 4 |
| 48 | Reserved (00h) | 4 |
| 52 | Exchange Area Usable Flag | 1 |
| 53 | Reserved (00h) | 971 |
| 1024 | User Data Last Recording Physical Sector Address (LRA) | 4 |
| 1028 | Latest Space Bitmap Start Physical Sector Address (AD_BPO) in TDMA | 4 |
| 1032 | Reserved (00h) | 1016 |

1 Sector (2048 bytes)

FIG.12

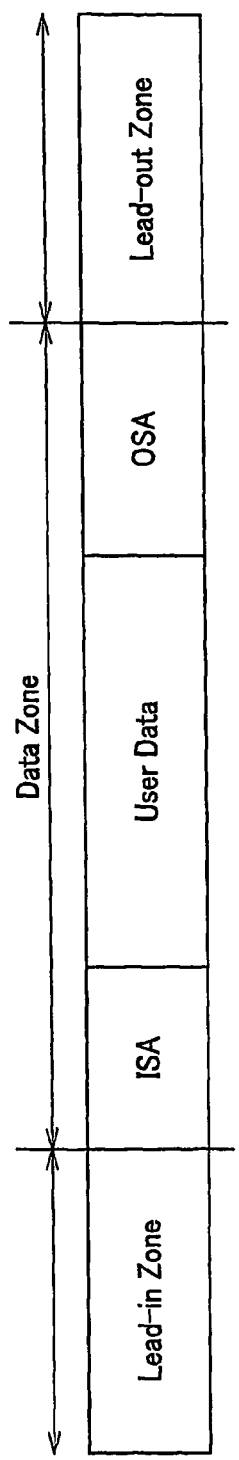
FIG.13A [Single-layer Disc]
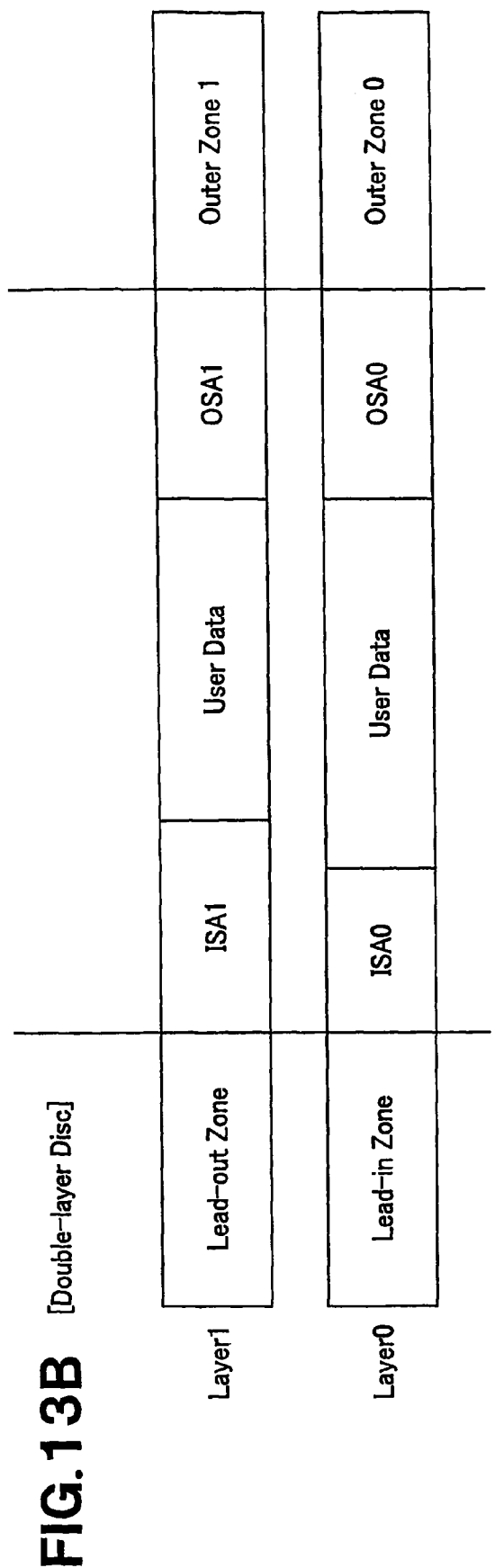
FIG.13B [Double-layer Disc]

Gap: Unrecorded Area Ahead of Recorded Area
LRA: Address of User Data Recorded on the Outermost Rim

RECORDING AND/OR REPRODUCING METHOD AND APPARATUS

TECHNICAL FIELD

This invention relates to a recording and/or reproducing method and a recording and/or reproducing apparatus for a recording medium, such as an optical disc, as a write-once recording medium.

This Application claims priority of Japanese Patent Application No. 2003-168876, filed on Jun. 13, 2003, the entirety of which is incorporated by reference herein.

BACKGROUND ART

As a technique for recording and/or reproducing digital data, there is a data recording technique employing, as a recording medium, an optical disc, inclusive of a magneto-optical disc, such as CD (Compact Disc), MD (Mini-Disc) or DVD (Digital Versatile Disc). The optical disc is a generic term of the recording medium comprising a disc of a thin metal sheet protected with plastics. The disc is illuminated by laser light and a signal is read out in terms of changes in the reflected laser light.

The optical disc may be classified into a read-only type, such as CD, CD-ROM or DVD-ROM, and a recordable type, allowing a user to record data thereon, such as MD, CD-R, CD-RW, DVDR, DVD-RW, DVD+RW or DVD-RAM. The recordable type disc allows for data recording by exploiting the magneto-optical recording system, a phase change recording system or a dye film change recording system. The dye film change recording system, also termed a write-once recording system, allows for data recording only once, while it does not allow for data rewriting. Thus, the dye film change recording system may conveniently be used for data saving. The magneto-optical recording disc or the phase change recording system allows for data rewriting and may be used for various application, including, first of all, recording various contents data, such as music, pictures, games or application programs.

Recently, a high-density optical disc, termed the Blu-ray Disc, has been developed to increase the recording capacity significantly.

This high-density disc records and/or reproduces data under a condition of the laser light with a wavelength of 405 nm (so-called blue laser) and an objective lens with the NA equal to 0.85. A data block of 64 kB (kilo-bytes) is used as a recording reproducing unit, with the track pitch of 0.32 μm and a line density of 0.12 μm/bit. If the format efficiency is 82%, a data volume of 23.3 GB (gigabytes) may be recorded and/or reproduced on a disc with a diameter of 12 cm.

With this high-density disc, a write-once type or a rewritable type has been developed.

For recording data on a recordable disc, such as a disc of the magneto-optical recording system, a dye film change recording system or a phase change recording system, it is necessary to provide a guide for tracking relative to a data track. To this end, a groove is formed from the outset as a pre-groove and the groove or a land (a part with a trapezoidal cross-section, defined between neighboring grooves) is used as a data track.

It is also necessary to record the address information to allow for data recording at a preset location on the data track. This address information is sometimes recorded by wobbling (meandering) the groove.

That is, the sidewall of a track, formed as a pre-groove for data recording, is wobbled in agreement with the address information.

In this case, the address can be read out from the wobbling information, obtained as the reflected light information during recording or reproduction, such that data may be recorded or reproduced for a desired location even if no pit data representing the address is pre-formed on the track.

The absolute time (address) information, represented by the wobbled groove, is termed the ATIP (Absolute Time In Pregroove) or ADIP (ADdress In Pregroove).

In such data-recordable recording medium (which is not read-only), there is known a technique providing an exchange area to exchange data recording positions on the disc. This technique is a defect management technique allowing optimum recording and/or reproduction by providing an exchange recording area which takes the place of a defect area unsuitable for data recording, such as a flaw, if such defect is present on the disc.

Meanwhile, if attention is directed to a write-once type optical recording medium, which allows recording only once, such as CD-R, DVD-R or a high density disc, such write-once type optical recording medium suffers from various constraints, because no data can be recorded on a prerecorded area.

In particular, in the write-once recording medium, the technique of updating the management information responsive to the data recording poses a problem.

That is, as a usual practice, the management information must be properly updated responsive to the recording of user data. On the other hand, management of the recording state of the user data based on the management information helps improve the processing speed in writing data on a disc or reading data from the disc.

However, with the write-once recording medium, it is not proper to update the management information each time user data is recorded on the recording medium, because the area for recording the management information is consumed excessively.

Considering that limitations are imposed on the size of the recording area for the management information, certain preset conditions need to be imposed on the recording of the management information on the disc.

For example, in the DVD-R, the management information, updated in the recording apparatus responsive to data recording, is recorded on the disc, subject to the write volume of the user data surpassing a preset volume.

Under these conditions, there is a time lag until the management information recorded on the disc is rewritten to a state reflecting the latest recording state of the user data actually recorded on the disc. That is, there is a time period during which the management information recorded on the disc does not reflect the recording state of the user data on the disc.

If, due to supply interruption, power down by the user operation or failure in writing, the management information cannot be properly updated on the disc, the management information is unmatched to the user data on the disc, such that unmanageable user data, that is, non-reproducible user data, is produced.

For preventing this from occurring, a variety of techniques have been proposed for holding the management information, even on power down, using e.g. a non-volatile memory, to enable the management information to be updated later on the disc, or to verify the non-matching between the management information and the user data on the disc to effect restoration processing, as described for example in the following Patent Publication 1:

[Patent Publication 1] Japanese Patent Application Laid-Open No. 2002-3122940

Meanwhile, in a recordable disc, the last address of the user data (last recording position information specifying the last position of recording of the user data) is sometimes provided as such one management information. This last address is termed the LRA (last recorded address), as an example. This last address is that of the area where user data has been written on the disc.

In the write-once optical disc, the usual practice is to pad user data sequentially from the leading end of the user data area for recording. Thus, in newly recording data, it is sufficient to record the data as from an address (LRA+1) next following the address LRA.

If it is desired to record data as from an address further in rear of LRA+1, such a technique is needed which consists in writing dummy data, such as zero data, for a domain as from the address LRA+1 to a recording start address, or registering the domain as an unrecorded area.

Meanwhile, the reason the data is padded sequentially from the inner rim of the write-once disc is that the conventional optical recording disc has been developed on the basis of a ROM type disc and hence replay cannot be made if there is an unrecorded area on the disc.

These circumstances impose limitations on the random access recording on the write-once recording medium.

In order to render a write-once disc more accessible at random, the present inventors have proposed in an international application (filing number: JP04/003212) such a technique consisting in providing the written/unwritten indicating information (space bitmap information) indicating whether or not data has been written, from one data unit in the recording area to another, as the management information, to enable a recorded area and a non-recorded area to be verified by this written/unwritten indicating information.

This enables data to be recorded in a desired address in a write-once disc, without being limited to sequentially padding the data for recording. It is then unnecessary to record dummy data to expedite the write processing and to reduce the processing load on the device.

However, even with the system exploiting the space bitmap, proper updating of the management information (space bitmap or LRA) on the disc poses a problem. That is, there is a demand for proper management information write processing whereby not only the management area on the disc is not wastefully consumed but also the time period of non-matching between the management information and the state of recording of the user data is not protracted excessively.

There is a also demand for facilitated setting of the matched state even in case the management information on the disc and the state of recording of the user data has become non-matched due to e.g. the power down of the device.

In this respect, there is a technique of holding the management information to be written on the disc by exploiting the conventional non-volatile memory. However, there is also a demand for a system not employing the non-volatile memory because the current non-volatile memory suffers from limitations on the number of times of data update events and hence is not suitable for recording frequently updated data.

DISCLOSURE OF THE INVENTION

In view of the above-depicted status of the art, it is an object of the present invention to provide a write-once recording medium in which the management information including the written/unwritten indication information (space bitmap) and the last recorded position information (LRA) indicating the last recorded position of the user data may be properly recorded on the disc, and in which, even in case of non-matching to the user data recording state, such non-matching can be coped with readily.

A recording and/or reproducing apparatus according to the present invention is a recording and/or reproducing apparatus for a recording medium, in a write-once recording area of which allowing for writing data once the management information and the user data are recorded, and in which the written/unwritten indicating information indicating whether data has been written in each data unit in at least an area for recording the user data and the last recording position information indicating the last position of recording of the recorded user data, are recorded as the management information. The apparatus comprises a recording and/or reproducing unit for recording and/or reproducing data for the recording medium, a storage unit for storage of the management information read out from the recording medium, and a controller for updating the contents of the management information stored in the recording unit, responsive to execution of data recording by the recording and/or reproducing unit, and for causing the recording and/or reproducing unit to record the management information, stored in the storage unit, on the recording medium, responsive to generation of an unrecorded area in a range up to a location on the recording medium indicated by the last recording position of the management information.

The controller is responsive to extinction of the unrecorded area in the range up to the location indicated by the last recording position information to cause the recording and/or reproducing unit to record the management information stored in the storage unit on the recording medium.

The controller executes the processing of confirming whether or not the last recording position information in the management information read out from the recording medium and stored in the storage unit is matched to the last position of the recorded user data on the recording medium; the controller updating the last recording position information in the management information stored in the storage unit in case of non-matching.

The controller executes the processing of confirming whether or not the unrecorded area determined by the written/unwritten indicating information in the management information read out from the recording medium and stored in the storage unit is matched to the unrecorded area on the recording medium. The controller updates the written/unwritten indicating information in the management information stored in the storage unit in case of non-matching.

A recording and/or reproducing method for the above recording medium comprises a step of reading out the management information from the recording medium for storage in a storage unit, a step of updating the contents of the management information stored in the storage unit, responsive to execution of the data recording on the recording medium, and a management information recording step of recording the management information stored in the storage unit, on the recording medium, responsive to generation of an unrecorded area in a range up to a location on the recording medium indicated by the last recording position information of the management information updated in the updating step.

The management information recording step is responsive to extinction of the unrecorded area in the range up to the location indicated by the last recording position information to cause the management information stored in the storage unit to be recorded on the recording medium.

The recording and/or reproducing method further comprises a step of verifying whether or not the last recording position information in the management information read out from the recording medium and stored in the storage unit is matched to the last position of the recorded user data on the recording medium, and a matching step of updating the last recording position information in the management information stored in the storage unit in case the verifying step has verified non-matching.

The recording and/or reproducing method further comprises a step of confirming whether or not the unrecorded area determined by the written/unwritten indicating information in the management information read out from the recording medium in the recording step and stored in the storage unit is matched to the unrecorded area on the recording medium, and a step of updating the written/unwritten indicating information in the management information stored in the storage unit in case the verifying step has verified non-matching.

Thus, the present invention provides a system, rendered accessible at random by employing the written/unwritten indicating information (space bitmap) in a write-once medium, in which the management information, including the written/unwritten indicating information (space bitmap) and the last recorded position information (LRA), indicating the last recorded user data position, may be updated at a proper timing on the disc. That is, although the gap (unrecorded area) may possibly be generated in an area ahead of the LRA (that is, in an area of an address younger than LRA), by the realization of random access recording, the management information is updated on the disc responsive to the gap generation or extinction (recording in the area retained to be the gap).

Moreover, since the management information is updated on the disc by the gap generation or extinction, the state of matching between the management information on the disc and the state of recording of the user data may be confirmed by detecting whether or not the gap or the LRA in the management information is coincident with the actual gap or LRA on the disc.

Lacking the matching, updating for matching the management information is only sufficient, that is, only the space bitmap or the LRA needs to be updated.

BRIEF DESCRIPTION OF THE DRAWINGS

FIG. 4 illustrates the DMA of a disc according to the present invention.

FIG. 5 illustrates the contents of the DDS of a disc according to the present invention.

FIG. 6 illustrates the contents of the DFL of a disc according to the present invention.

FIG. 7 illustrates the defect list management information of the DFL and the TDFL of a disc according to the present invention.

FIG. 8 illustrates the exchange address information of the DFL and the TDFL of a disc according to the present invention.

FIG. 9 illustrates the TDMA of a disc according to the present invention.

FIG. 10 illustrates a space bitmap of a disc according to the present invention.

FIG. 11 illustrates the TDFL of a disc according to the present invention.

FIG. 12 illustrates the TDDS of a disc according to the present invention.

FIGS. 13A and 13B illustrate the ISA and OSA of a disc according to the present invention.

BEST MODE FOR CARRYING OUT THE INVENTION

Figure 1:
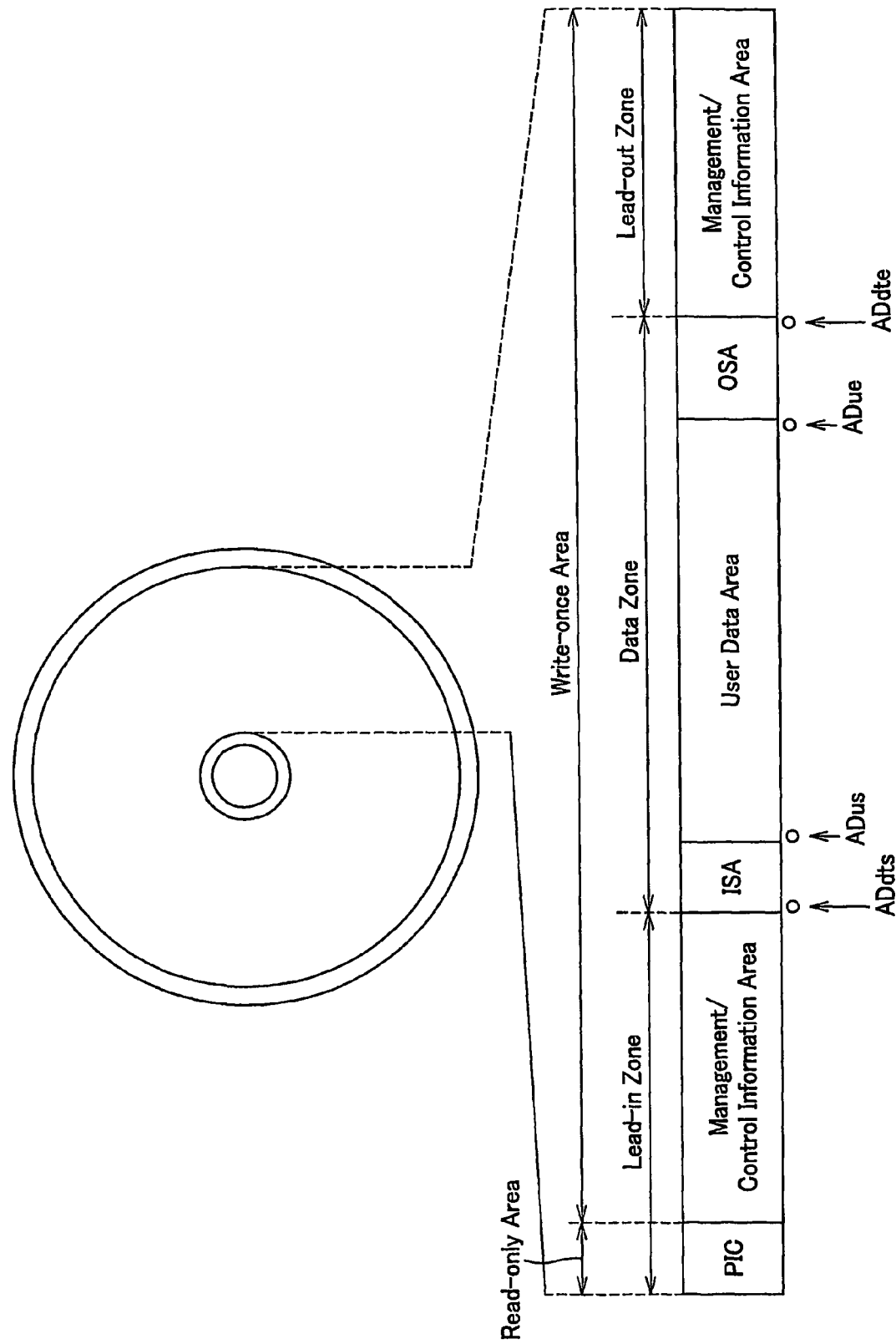
FIG. 1 illustrates an area structure of a disc according to the present invention.

An optical disc, embodying the present invention, and a disc driving device, operating as a recording apparatus and as a reproducing apparatus for the optical disc, are hereinafter explained. The explanation is made in the following sequence:
1. Disc structure
2. DMA
3. TDMA system
3-1 TDMA
3-2 ISA and OSA
4. Disc drive device
5. Gap generation and extinction
6. TDMA updating
6-1 Updating responsive to gap generation and extinction
6-2 Updating at the time of disc ejection
6-3 Updating responsive to command from host
7. Processing of verifying the matching
8. Effect of the present embodiment and modification 1. Disc Structure First, an optical disc, embodying the present invention, is explained. This optical disc may be implemented as a write-once disc within the category of a high density optical disc system, termed a Blu-ray disc.

The following is typical of the physical parameters of the high density optical disc system embodying the present invention.

As for the disc size, the optical disc of the present embodiment is 120 mm in diameter and 1.2 mm in thickness. That is, in these respects, the optical disc of the present embodiment is similar to the disc of the CD (Compact Disc) system or the DVD (Digital Versatile Disc) system, insofar as the outer shape of the disc is concerned.

As the laser for recording and/or reproduction, the so-called blue laser is used. The user data capacity of 23 Gbytes to 25 Gbytes is realized, with a disc 12 cm in diameter, by employing a high NA (numerical aperture), for example, a NA=0.85, and by realizing a narrow track pitch, for example, a track pitch=0.32 µm, and a high line density, for example, the shortest recording mark length=0.12 µm.

A so-called double-layer disc, having two recording layers, has been developed. With the double-layer disc, the user data capacity is on the order of 50 Gbytes.

FIG. 1 shows the layout (area structure) of the entire disc.

As for the areas on the disc, a lead-in zone, a data zone and a lead-out zone are arrayed in this order, looking from the inner rim side.

In terms of the area structure pertinent to recording and/or reproduction, a prerecorded information area PIC of the innermost rim side of the lead-in zone is a read-only area, while the zone from the management area of the lead-in zone up to the lead-out zone is the write-once area which allows for recording only once.

In the read-only area and in a write-once area, there is formed a spirally extending recording track by a wobbling groove (meandering groove). The groove is used as a guide for tracking in tracing by a laser spot, while being used as a recording track for data recording and/or reproduction.

Although an optical disc in which data is recorded on the groove is presupposed, the present invention may be applied to an optical disc of the land recording system in which data is recorded on the land between neighboring grooves, or to an optical disc of the land-groove recording system in which data is recorded on both the groove and the land.

The groove as the recording track is meandering in keeping with the wobble signals. Thus, with the disc driving device for the optical system, the wobble signal may be reproduced by detecting both edge positions of the groove from the reflected light of the laser spot illuminated on the groove and by extracting the components of variations of the edge positions relative to the radial direction of the disc that are caused on moving the laser spot along the recording track.

In the wobble signals is modulated the address information of the recording track (physical address and other additional information) for the recording position in question. Hence, in the disc driving device, address control for data recording and/or reproduction, for example, may be managed by demodulating e.g. the address information from these wobble signals.

The lead-in zone, shown in FIG. 1, is an area which is on the radially inner side than a position with a radius of 24 mm.

The portion in the lead-in zone, with a radius of from 22.2 mm to 23.1 mm is the prerecorded area PIC.

In this pre-recorded area PIC, there may be recorded the disc information, such as the power conditions for recording and/or reproduction, disc area information or the information used for copy protection, for example, is pre-recorded from the outset as the read-only information by wobbling the groove. The above information may also be recorded by, for example, embossing pits.

Although not shown, a BCA (burst cutting area) may be provided on the further radially inner side than the pre-recorded area PIC. The BCA is an area where the unique ID proper to the disc recording medium has been recorded by a recording system of burning the recording layer off. That is, by forming the recording marks so that the marks are arrayed concentrically, there are formed bar-code-like recording data.

The portion in the lead-in zone, with a radius of from 23.1 mm to 24 mm, is a management/control information area.

In the management/control information area, a predetermined area format, having e.g. a control data area, a DMA (defect management area), TDMA (temporary defect management area) and a test write area (OPC) and a buffer area, is set.

In the control data area in the management/control information area, the following management/control information is recorded:

That is, there are recorded the disc type, disc size, disc version, layer structure, channel bit length, BCA information, transfer rate, data zone position information, recording line velocity and the recording and/or reproduction laser power information.

The test write area (OPC), similarly provided within the management/control information area, is used for test writing in setting data recording and/or reproducing conditions, such as laser power at the time of recording and/or reproduction. That is, the test write area is an area for adjusting the recording and/or reproducing conditions.

The DMA is provided within the management/control information area. In the field of the optical disc, the exchange management information for defect management is usually recorded. However, in the disc of the present embodiment, not only the exchange management information for defect management, but also the management/control information for implementing data rewriting, is recorded in this write-once disc. In particular, in this case, the ISA and OSA management information, as later explained, is recorded in the DMA.

For enabling data rewriting, by taking advantage of the exchange processing, the contents of the DMA must be updated responsive to the data rewriting. The TDMA is provided for this purpose.

The exchange management information is additionally recorded in the TDMA for updating. In the DMA, the last (latest) exchange management information, recorded in the TDMA, is recorded.

In the TDMA, there is further recorded the information termed a space bitmap and the information termed the LRA. Such information becomes the information for realizing random accessibility even though the disc is the write-once medium.

The DMA and the TDMA will be discussed later in more detail.

An area from a radius of 24.0 mm to a radius of 58.0 mm, which is on a radially outer side of the lead-in zone, is a data zone. The data zone is an area where user data is actually recorded and/or reproduced. A data zone start address ADdts and a data zone end address ADdte are indicated by the data zone position information of the aforementioned control data area.

An ISA (inner spare area) and an OSA (outer spare area) are provided on the innermost side and on the outermost side in the data zone, respectively. The ISA and the OSA serve as an exchange area for rewriting (overwriting) of data or defects, as will be explained subsequently.

The ISA is formed by a preset number of clusters from the start position of a data zone (one cluster=65536 bytes).

The OSA is formed by a preset number of cluster sizes towards the inner side from the end position of the data zone.

The sizes of the ISA and the OSA are stated in the above DMA.

In the data zone, a domain sandwiched between the ISA and the OSA represents a user data area. This user data area is the usual recording and/or reproducing area usually employed for recording and/or reproduction of user data.

The position of the user data area, that is, the start address ADus and the end address ADue, is stated in the above DMA.

An area from a radius of 58.0 mm to a radius of 58.5 mm, which is on a radially outer side of the data zone, is a lead-out zone. This lead-out zone is a management/control information area where a control data area, a DMA and a buffer area, for example, are formed to a predetermined format. In the control data area, as in the control data area in the lead-in zone, there is recorded a variety of the management/control information. The DMA is provided, as is the DMA in the lead-in zone, as an area in which to record the management information for the ISA and the OSA.

Figure 2:
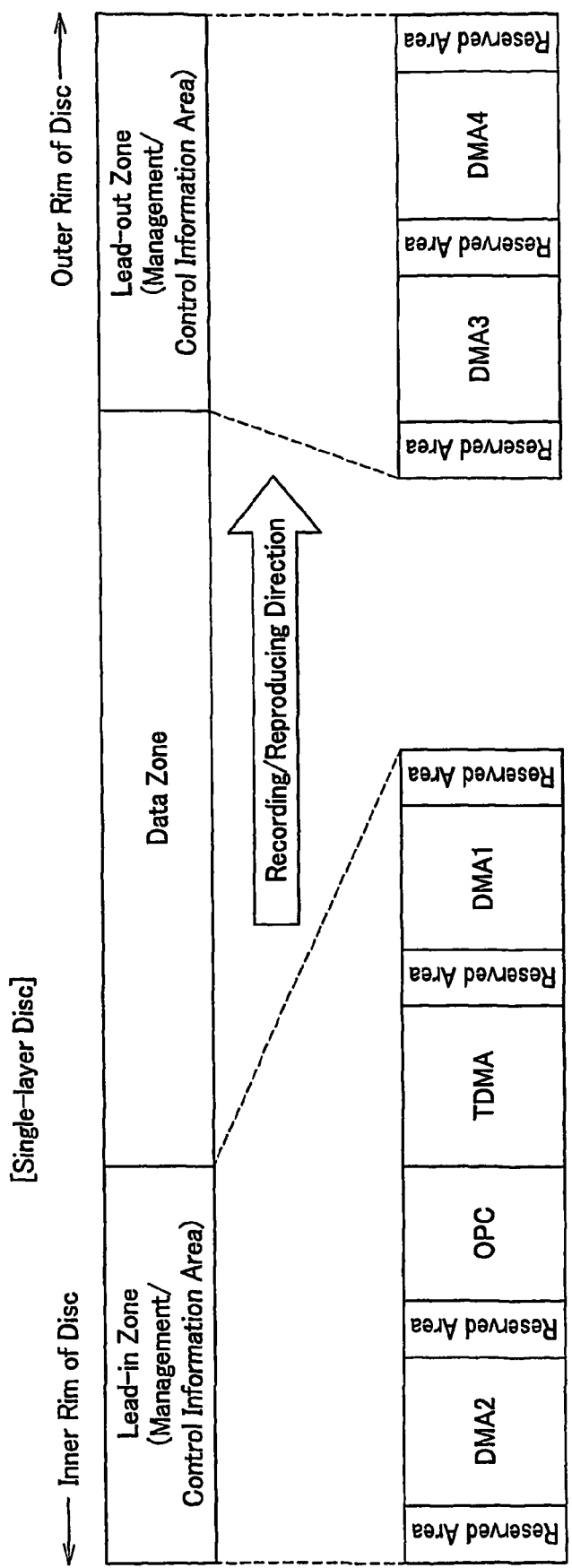
FIG. 2 illustrates a single-layer disc structure according to the present invention.

FIG. 2 shows an illustrative structure of a management/control information area in a single-layer disc, that is, a disc having a single recording layer.

In the lead-in zone, areas of DMA2, OPC (test write area), TDMA and DMA1, are provided, except an undefined area (reserved area). In the lead-out zone, areas of DMA3 and DMA4, are provided, except an undefined area (reserved area).

Although the above-described control data area is not shown, such area is omitted from the drawing, because in actuality a portion of the control data area becomes the DMA and the structure pertinent to the DMA/TDMA is relevant to the present invention.

Thus, four DMAs are provided in the lead-in zone and in the lead-out zone. In each of the DMA1 to the DMA4, the same exchange management information is recorded.

However, the TDMA is provided, and the exchange management information is initially recorded using the TDMA. The exchange management information is updated by being additionally recorded in the TDMA responsive to generation of the exchange processing by defects or data rewrite events.

Thus, no DMA is used until the disc is finalized, such that the exchange operation is carried out in the TDMA. Moreover, if the disc is finalized, the latest exchange management information, recorded at such time point in the TDMA, is recorded in the DMA, such that the exchange management by the DMA becomes possible.

Figure 3:
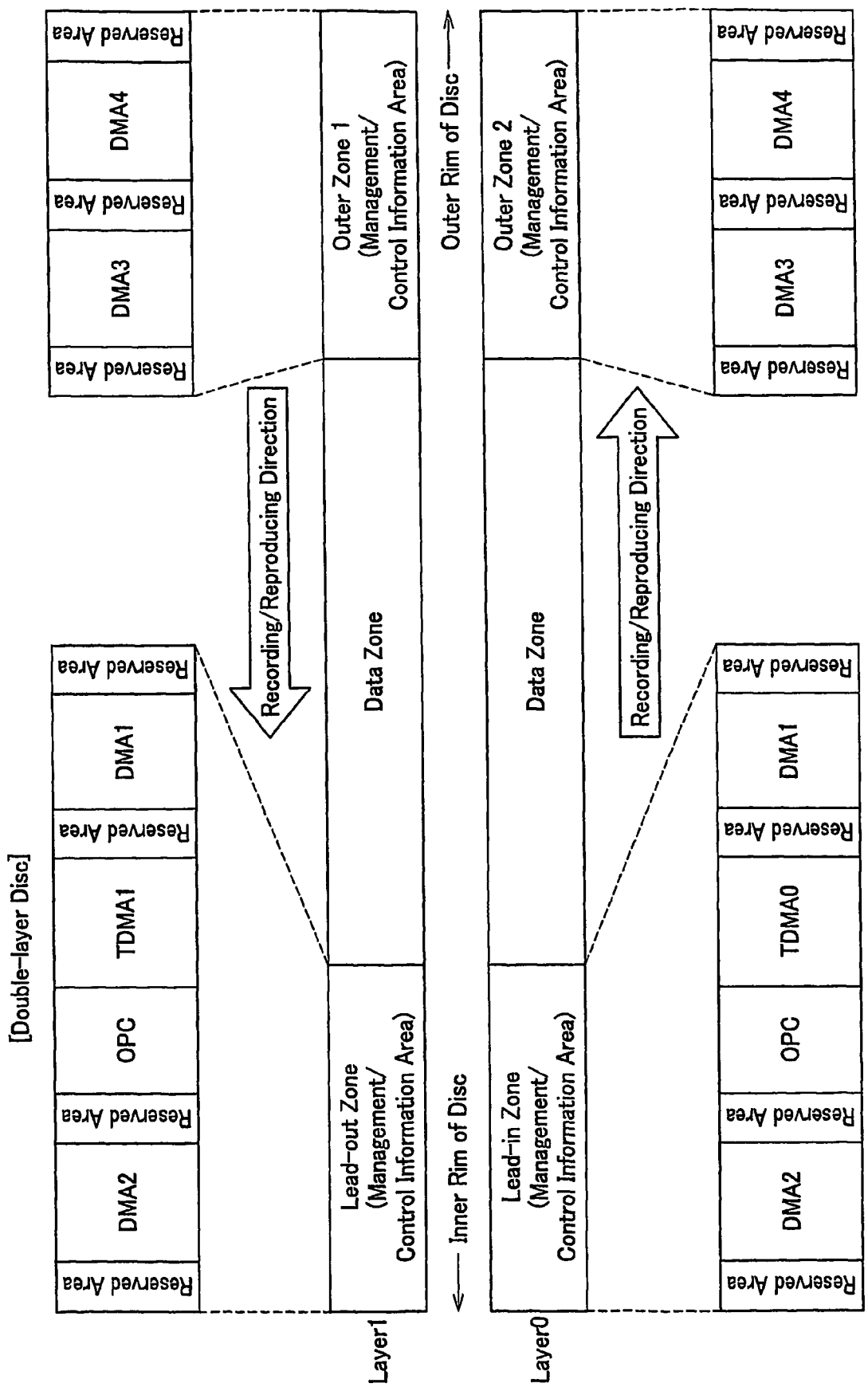
FIG. 3 illustrates a double-layer disc structure according to the present invention.

FIG. 3 shows a double-layer having two recording layers. The first and second recording layers are also termed a layer 0 and a layer 1, respectively.

In the layer 0, the recording and/or reproduction proceeds from the inner rim towards the outer rim of the disc, as in the case of the single-layer disc.

In the layer 1, the recording and/or reproduction proceeds from the outer rim towards the inner rim of the disc.

The physical addresses are also increased in the same direction. That is, the physical address is increased in the layer 0 from the inner rim towards the outer rim, while it is increased in the layer 1 from the outer rim towards the inner rim.

As in the single-layer disc, the areas of the DMA2, OPC (test write area), TDMA and DMA1 are formed in the lead-in zone of the layer 0. The outermost rim side of the layer 0 is not the lead-out and hence is simply termed an outer zone 0. The DMA3 and DMA4 are formed in the outer zone 0.

The outermost rim of the layer 1 is an outer zone 1. The DMA3 and DMA4 are also formed in the outer zone 1. The innermost rim side of the layer 1 is the lead-out zone. In this lead-out zone, there are formed respective areas of DMA2, OPC (test write area), TDMA and DMA1.

Thus, in the lead-in zone, outer zones 0 and 1 and in the lead-out zone, there are provided eight DMAs. The TDMA is provided to each recording layer.

The size of the lead-in zone of the layer 0 and the size of the lead-out zone of the layer 1 are the same as that of the lead-out zone of the single-layer disc.

The size of the outer zones 0 and 1 is the same as that of the lead-out zone of the single-layer disc.

2. DMA

The structure of the DMA, recorded in the lead-in zone and in the lead-out zone (and the outer zones 0 and 1 in the case of the double-layer disc), is hereinafter explained.

FIG. 4 shows the structure of the DMA.

The size of the DMA being 32 clusters (32×65536 bytes) is taken as an example. Meanwhile, the cluster is the smallest unit of data recording.

Of course, the DMA size is not limited to 32 clusters. In FIG. 4, the 32 clusters are given the cluster numbers 1 to 32 and the data positions of the respective contents in the DMA are specified. The respective sizes of the contents are specified as the number of the clusters.

In the DMA, there is the detailed disc information, as the DDS (disc definition structure) in the four cluster domains bearing the cluster numbers of from 1 to 4.

As for the contents of the DDS, explained with reference to FIG. 5, the DDS is of a size of one cluster, and is repeatedly recorded four times in the four cluster domain.

The four cluster domain with the cluster numbers of 5 to 8 is the first recording area (DFL#1) of the defect list DFL. As for the structure of the DFL, explained with reference to FIG. 6, the defect list DFL is data of 4 cluster size, in which there is listed up the individual exchange address information.

The four cluster domain with the cluster numbers of 9 to 12 is the second recording area (DFL#2) of the defect list DFL.

The recording areas of the third and the following defect lists DFL#3 to DFL#6 are provided, each by four clusters. The four cluster domain with the cluster numbers of 29 to 32 is the seventh recording area (DFL#7) of the defect list DFL.

That is, seven recording areas of DFL#1 to DFL#7 of the defect list are provided in the 32 cluster DMA.

In the case of the write-once optical disc, capable of writing only once, the processing termed finalizing has to be carried out for recording the contents of the DMA. In such case, the seven recording areas of DFL#1 to DFL#7 of the defect list, written in the DMA, are all of the same contents.

The contents of the DDS, recorded at the leading end of the DMA of FIG. 4, are shown in FIG. 5.

The DDS has the size of one cluster (=65536 bytes), as mentioned previously.

In FIG. 5, the byte positions are indicated such that the leading byte of the 65536 byte DDS is the byte 0. The number of bytes indicates the number of bytes of the respective data contents.

In the two bytes of the byte positions of 0 and 1, there is recorded a DDS identifier='DS' for recognition that the cluster in question is the DDS cluster.

In the byte with the byte position of 2, there is indicated the DDS type number (format version).

In the four bytes, with the byte positions of 4 to 7, the number of times of DDS update events is recorded. Meanwhile, in the present embodiment, the exchange management information is written for the DMA itself, at the time of finalizing, but the DMA is not updated, and the exchange management information is taken charge of in the TDMA. Hence, at the last finalizing, the number of times of the update events of the DDS (TDDS: temporary DDS), carried out in TDMA, is recorded at the relevant byte positions.

In the four bytes of the byte positions from 24 to 27, there is recorded the leading physical sector address (AD DFL) of the defect list DFL in the DMA.

In the four bytes of the byte positions from 32 to 35, the leading position of the user data area in the data zone, that is, the "0" LSN (logical sector number) position, is specified by the PSN (physical sector number or physical sector address).

In the four bytes of the byte positions from 36 to 39, the terminal position of the user data area in the data zone is specified by the LSN (logical sector address).

In the four bytes of the byte positions from 40 to 43, there is specified the size of the ISA in the data zone.

In the four bytes of the byte positions from 44 to 47, there is specified the size of the OSA in the data zone.

In the 1 byte of the byte position 52, there is indicated an exchange area usable flag, indicating whether or not data rewriting is possible with the use of the ISA and the OSA. The exchange area usable flag indicates that the ISA or the OSA has all been used.

The remaining byte positions are reserved, that is, undefined, and are all set to 00h.

That is, the DDS includes the address of the user data area, the sizes of the ISA and the OSA, and the exchange area usable flag, viz., the DDS is the management/control information responsible for area management of the ISA and the OSA in the data zone.

FIG. 6 shows the structure of the defect list DFL.

The defect list DFL is recorded in the four-cluster recording area, as explained with reference to FIG. 4.

In FIG. 6, the data positions of the respective data contents in the four-cluster defect list DFL are specified in terms of the byte positions. Meanwhile, one cluster=32 sectors=65536 bytes, with one sector being 2048 bytes.

The number of bytes indicates the number of bytes as the size of each data content.

The leading 64 bytes of the defect list DFL is the defect list management information.

As this defect list management information, the information for recognizing that the cluster in question is the cluster of the defect list, as well as the information indicating the version, number of times of update events of the defect list, or the number of entries of the defect list, is recorded.

The byte number 64 ff. records the exchange address information ati, each of 8 bytes, as the entry contents of the defect list.

Directly after the last effective exchange address information ati#N, 8 bytes of the terminator information, as the trailing end of the exchange address information, are recorded.

In this DFL, 00h is padded from the terminal end of the exchange address information up to the trailing end of the cluster.

The 64-byte defect list management information is shown in FIG. 7.

In the two bytes from the byte position 0, a letter string of 'DL' is recorded as an identifier of the defect list DFL.

The one byte at the byte position 2 denotes the form number of the defect list DFL.

The four bytes as from the byte position 4 denote the number of times the defect list DFL is updated. Meanwhile, this is the value which has inherited the number of times of update events of the temporary defect list TDFL which will be explained subsequently.

The four bytes as from the byte position 12 indicate the number of entries in the defect list DFL, that is, the number of the exchange address information ati.

The four bytes as from the byte position 24 indicate the size of the vacant areas of the exchange areas ISA and OSA in terms of the number of clusters.

The remaining byte positions are reserved and are all set to 00h.

FIG. 8 shows the structure of the exchange address information ati, which is the information indicating the exchange-processed respective entry contents.

The total number of the exchange address information ati in the case of the single-layer disc is 32759 at the maximum.

Each exchange address information ati is made up by 8 bytes (64 bits). These bits are indicated as bit b63 to bit b0.

By the bit b63 to the bit b60, the status information of the entries (status 1) is recorded.

In the DFL, the status information is '0000', indicating the usual exchange processing.

The other status information values are discussed in connection with the explanation of the exchange address information ati of TDFL in TDMA.

The bits b59 to b32 indicate the initial physical sector address PSN of the exchange source cluster. That is, the cluster, exchanged by a defect or a data rewrite event, is indicated by the physical sector address PSN of the leading sector.

The bits b31 to b28 are reserved. The other status information (status 2) in the entry may also be recorded.

The bits b27 to b0 indicate the leading physical sector address PSN of the exchange source cluster.

That is, when the cluster is exchanged by a defect or a rewrite event, the cluster of the exchange destination cluster is indicated by the leading physical sector address PSN of the leading sector.

The above-described exchange address information ati is one entry for specifying the exchange source cluster and the exchange destination cluster pertinent to a given exchange processing.

Such entry is registered in the defect list DFL of the structure shown in FIG. 6.

In the DMA, the exchange management information is recorded by the above-described data structure. However, it is when the disc is finalized that the above information is recorded on the DMA, as described above, in which case the DMA reflects the latest exchange management information in the TDMA.

The exchange processing for defect management or data rewriting and the updating of the corresponding exchange management information is carried out in TDMA which is now explained.

3. TDMA System 3-1 TDMA

The TDMA, provided in the management/control information area as shown in FIGS. 2 and 3, is now explained. Similarly to the DMA, the TDMA (temporary DMA) is an area in which to record the exchange management information. However, the TDMA is updated by additional recording of the exchange management information responsive to the occurrence of the exchange processing responsive in turn to the data rewrite event or to the defect detection.

FIG. 9 shows the structure of the TDMA.

The size of the TDMA is e.g. 2048 clusters.

As shown, the first cluster of the cluster number 1 records the space bitmap.

The space bitmap is the information indicating whether or not a given cluster has already been written. Specifically, each one bit is allocated to each cluster of a data zone as a main data area to indicate whether or not a given cluster has already been written, based on the value of the associated bit. The data zone may incidentally include the lead-in zone and the lead-out zone (outer zone) as the management/control area.

In the space bitmap, all of the clusters forming at least a data zone (or further the lead-in zone and the lead-out zone (outer zone)) are each allocated to one bit. This space bitmap may be of one cluster size.

In the case of a disc having plural recording layers, such as a double-layered disc, the space bitmap, associated with each layer, is each recorded in each cluster. Alternatively, it is sufficient if the space bitmap of each recording layer is recorded in the TDMA.

If, in the TDMA, exchange processing is carried out due to e.g. change in the data contents, TDFL (temporary defect list) is additionally recorded in the leading cluster of the unrecorded area in the TDMA. Hence, the first TDFL is recorded as from e.g. the position of the cluster number 2. On occurrence of exchange processing events, the TDFL is additionally recorded in the consecutive cluster positions.

The TDFL size is from one cluster up to the maximum of four clusters.

Since the space bitmap specifies the write state of each cluster, the space bitmap is updated responsive to the occurrence of each data write event. In such case, the new space bitmap is formed as from the leading end of the vacant area in the TDMA, as in the case of the TDFL.

That is, in the TDMA, the space bitmap or the TDFL is post-written.

Although the structure of the space bitmap and the TFDL will be discussed subsequently, the TDDS (temporary disc definition structure), as the detailed optical disc information, is recorded in the trailing sector (2048 bytes) of the one cluster of the space bitmap and the clusters 1 to 4 of the TDFL.

FIG. 10 shows the structure of a space bitmap.

The space bitmap is such a bitmap in which the recorded/unrecorded state of one cluster on the disc is represented by one bit, with the bit corresponding to the unrecorded cluster being '0' and with the bit corresponding to the cluster having data recorded thereon being '1', as described above.

In the case of one sector=2048 bytes, the capacity of one recording layer of 25 GB may be formed by a bitmap with a size of 25 sectors. That is, the space bitmap may be formed by the size of one cluster (=32 sectors).

In FIG. 10, the 32 sectors within each cluster is represented by sectors 0 to 31. The byte position is indicated by the byte position in the sector.

In the leading sector 0, there is recorded a variety of the information for management of the space bitmap.

In the two bytes of the byte positions from 0 to 2, in the sector 0, "UB" is recorded as a space bitmap ID (Un-allocated Space Bitmap Identifier).

In the one byte of the byte position 2, the format version (form number) of, for example, '00h', is recorded.

In the four bytes as from the byte position 4, the layer numbers are recorded. These numbers indicate whether the space bitmap is for the layer 0 or the layer 1.

In the 48 bytes from the byte position 16, there is recorded the bitmap information.

As for the bitmap information, the start cluster position (Start Cluster First PSN), the start position of the bitmap data (Start Byte Position of Bitmap data) and the length of the bitmap data (Variable Bit Length in Bitmap data) are each of four bits, with the remaining being reserved.

In the start cluster position (Start Cluster First PSN), the position of the first cluster, supervised by the space bitmap on the disc, is represented by the PSN (physical sector address).

The start position of the bitmap data (Start Byte Position of Bitmap data) specifies the start position of the bitmap data itself by the number of the bytes as the relative position from the Un-allocated Space Bitmap Identifier at the leading end of the space bitmap. In the example of FIG. 10, the data from the leading byte position of the sector 1 becomes the bitmap data, with the position of the bitmap data being indicated by the number of the bytes.

The length of the bitmap data (Variable Bit Length in Bitmap data) specifies the length of the bitmap data with the number of the bits.

Actual bitmap data (Bitmap data) are recorded as from the byte position 0 of the second sector (=sector 1) of the space bitmap of FIG. 10. The length of the bitmap data is one sector per GB.

An area downstream of the last bitmap data to a location ahead of the last sector (sector 31) is reserved and is '00h'.

The TDDS is recorded in the last sector (sector 31) of the space bitmap.

The structure of the TDFL (temporary DFL) is now explained. Referring to FIG. 9, the TDFL is recorded in a vacant area in the TDMA next following the space bitmap, and is post-written at the leading end of the vacant area each time the TDMA is updated.

FIG. 11 shows the structure of the TDFL.

The TDFL is made up by clusters 1 to 4. The contents of the TDFL may be understood by comparison with the DFL of FIG. 6. That is, the contents of the TDFL is similar to those shown in FIG. 6 in that the leading 64 bytes represent the defect list management information, the exchange address information ati of each 8 bytes is recorded as from the byte position 64, and in that the eight bytes next following the last exchange address information ati#N represent the trailing end of the exchange address information.

However, the TDFL differs from the DFL in that, in the TDFL of the clusters 1 to 4, the temporary DDS (TDDS) is recorded in the last sector of 2048 bytes.

Meanwhile, in the TDFL, 00h is padded up to ahead of the last sector of the cluster to which belongs the trailing end of the exchange address information. The TDDS is recorded in the last sector. In case the trailing end of the exchange address information belongs to the last sector of the cluster, 0 is padded up to ahead of the last sector of the next cluster, and the TDDS is recorded in the last sector.

The 64-byte defect list management information is similar to the defect list management information of DFL explained with reference to FIG. 7.

However, as for the number of times of the update events of the defect list of four bytes as from the byte position 4, the serial number of the temporary defect list is recorded. By so doing, the serial number of the defect list management information in the latest TDFL represents the number of times of update events of the defect list.

It is noted that, as for the number of entries in the defect list DFL of four bytes from the byte position 12, that is, the number of the exchange address information ati, and the size of the vacant areas of the ISA and the OSA of the four bytes as from the byte position 24, the values at the TDFL update time points are recorded.

The structure of the exchange address information ati in the TDFL is similar to that of the exchange address information ati in the DFL shown in FIG. 8, such that the exchange address information ati is one entry and both the exchange source cluster and the exchange destination cluster pertinent to one exchange processing are shown. Such entry is registered in the temporary defect list TDFL of the structure of FIG. 11.

It is noted that the status 1 of the exchange address information ati of the TDFL may also be '0101' or '1010', in addition to being '0000'.

The status 1 being '0101' or '1010' is such a case in which, when physically contiguous plural clusters are collectively subjected to exchange processing, these clusters are collectively subjected to exchange management (burst transfer management).

That is, when the status 1 is '0101', the leading physical sector address of the exchange source cluster and the leading physical sector address of the exchange destination cluster of the exchange address information ati represent the exchange source and the exchange destination of the leading one of plural physically consecutive clusters.

On the other hand, when the status 1 is '1010', the leading physical sector address of the exchange source cluster and the leading physical sector address of the exchange destination cluster of the exchange address information ati represent the exchange source and the exchange destination of the last one of plural physically consecutive clusters.

Thus, when the plural physically consecutive clusters are collectively subjected to exchange processing, it is unnecessary to enter the exchange address information ati for each of the plural clusters, but it is only sufficient if the two exchange address information ati of the leading and trailing clusters are entered.

The TDFL is basically similar in structure to the DFL, but is featured by being extensible in size up to four clusters, by recording TDDS in the last sector and by the possibility of burst transfer management as the exchange address information ati.

In the TDMA, the space bitmap and the TDFL are recorded, as shown in FIG. 9. However, the TDDS (temporary disc definition structure) is recorded in 2048 bytes as the last sector of the TDFL and the space bitmap, as described above.

The structure of the TDDS is shown in FIG. 12.

The TDDS is formed by one sector (2048 bytes), and has contents similar to those of the DDS in the above DMA. Although the DDS is formed by one cluster (65536 bytes), substantial contents of the DDS are defined up to the byte position 52, as explained with reference to FIG. 5. That is, the substantial contents are recorded in the leading sector of one cluster. Hence, the DDS contents may be comprehended even though the TDDS is formed by one sector.

As may be seen from the comparison of FIGS. 12 and 5, the TDDS has contents similar to those of the DDS up to the byte positions 0 to 53. However, the TDDS serial numbers are recorded as from the byte position 4 and the start physical address (AD DFL) of TDFL in the TDMA is recorded as from the byte position 24.

As from the byte position 1024 of the TDDS, the information not provided in the DDS is recorded.

The LRA (last recorded address) is recorded, as the last recording position information, indicating the last position of the recorded user data, in the four bytes as from the byte position 1024. This is the radially outermost physical sector address PSN in the user data area where the data is recorded.

In the four bytes as from the byte position 1028, the start physical sector address (AD BP0) of the latest space bitmap in the TDMA is recorded.

The other bytes than the above byte positions are reserved and are all of the contents of 00h.

Thus, the TDDS includes the address of the user data area, the sizes of the ISA and the OSA, and the exchange area usable flag. That is, the TDDS is the management/control information responsible for area management of the ISA and the OSA in the data zone. In this respect, the TDDS is similar to the DDS.

The TDDS also includes the LRA, as the latest user data recording position information, and the information specifying the effective latest space map bit position (AD BP0).

Since the TDDS is recorded in the last sector of the space bitmap and in the last sector of the TDFL, new TDDS is recorded each time the space bitmap or the TDFL is added.

Thus, in the TDMA of FIG. 9, the last added TDDS in the space bitmap or in the TDFL becomes the latest TDDS and represents the latest space bitmap.

Thus, even though the space bitmap is additionally recorded and updated, it is possible to grasp the space bitmap to be referenced at the current time point.

3-2 LSA and OSA

FIGS. 13A and 13B show the ISA and OSA positions.

The ISA (inner space area; inner rim side exchange area) and the OSA (outer space area; outer rim side exchange area) are areas provided in the data zone as exchange areas for exchange processing for defective clusters.

The ISA and the OSA are also used as exchange areas for actually recording the data to be written in a target address in case a request has been made for writing in the recorded address, that is, a request has been made for rewriting the data.

FIG. 13A shows the case of a single-layer disc. The ISA and the OSA are formed on the radially innermost and radially outermost sides of the data zone, respectively.

FIG. 13B shows the case of a double-layer disc. The ISA0 and the OSA0 are formed on the radially innermost and radially outermost sides of the layer 0 of the data zone, respectively, while the ISA1 and the OSA1 are formed on the radially innermost and radially outermost sides of the layer 1 of the data zone, respectively.

In the double-layer disc, the ISA0 and the ISA1 sometimes differ in size from each other. The OSA0 and the OSA1 are of the same size.

The sizes of the ISA (or the ISA0, ISA1) and the OSA (or the OSA0, OSA1) are defined within the aforementioned DDS and TDDS.

The size of the ISA is determined at the time of the initialization and remains fixed subsequently. Conversely, the size of the OSA may be changed even after the data recording. That is, the OSA size may be enlarged by changing the size of the OSA recorded in the TDDS in updating the TDDS.

The exchanging processing employing the ISA and the OSA is carried out as follows: The case of data rewriting is taken as an example. Assume that the request for data writing for a cluster in the user data area where data has already been recorded, that is, the request for data rewriting, has been made. Since the disc in this case is a write-once disc, and writing cannot be made for the cluster, the rewrite data is written in a cluster in the ISA or in the OSA. This is the exchange processing.

This exchange processing is supervised as an entry for the aforementioned exchange address information ati. That is, the exchange address information ati is entered with the cluster address, where the data has inherently been recorded, and with the cluster address, where the rewrite data has been written in the ISA or in the OSA, as the exchange source and as the exchange destination, respectively.

That is, in case of data rewriting, the rewrite data is recorded in the ISA or in the OSA, and the exchange of the data positions by the rewriting is supervised by the exchange address information ati in the TDFL in the TDMA. Thus, data rewriting is substantially realized, from e.g. the perspective of the OS of the host system, or the file system, even though the disc is the write-once disc.

The same holds for the defect management. If a given cluster is retained to be a defective area, the data to be written there is written in a certain cluster in the ISA or in the OSA by exchange processing and, for supervising this exchange processing, one exchange address information ati is entered.

4. Disc Drive Device

A disc drive device (recording and/or reproducing device) for the above-described write-once disc is hereinafter explained.

The present embodiment of the disc drive device formats a write-once disc, for example, a disc where only the prerecorded information area PIC of FIG. 1 has been formed and the write-once area is left unrecorded, whereby the disc layout explained with reference to FIG. 1 may be formed. Moreover, data may be recorded and/or reproduced for such formatted disc, and recording/updating may also be made for the TDMA, ISA and in the OSA, as necessary.

Figure 14:
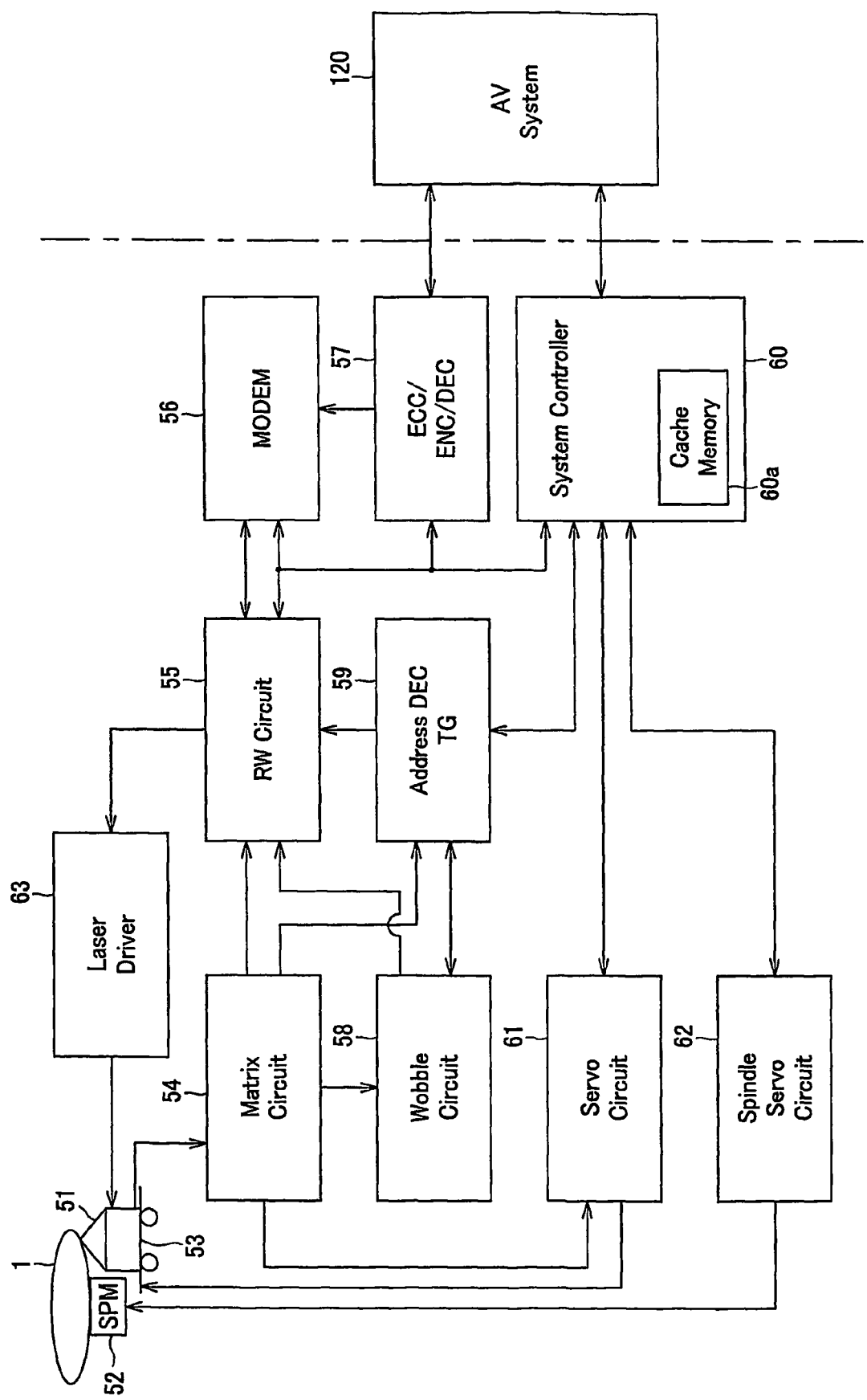
FIG. 14 is a block diagram of a disc driving apparatus according to the present invention.

FIG. 14 shows the structure of the disc drive device.

A disc 1 is the aforementioned write-once disc. This disc 1 is loaded on a turntable, not shown. During the recording and/or reproducing operation, the disc 1 is run in rotation at a constant linear velocity (CLV) by a spindle motor 52.

By an optical pickup (optical head) 51, the ADIP address or the management/control information, as the prerecorded information, embedded as wobbling of the grooved track on the disc 1, is read out by an optical pickup (optical head) 51.

In initializing/formatting or recording the user data, the management/control information or the user data is recorded in the track in the write-once area, by the optical pickup 51. During replay, the recorded data is read out by the optical pickup 51.

Within the optical pickup 51, there are provided a laser diode, as a laser light source, not shown, a photodetector for detecting the reflected light, not shown, an objective lens, as an output end of the laser light, not shown, and an optical system, also not shown, for illuminating the laser light through an objective lens to a disc recording surface or routing the reflected light to the photodetector.

Within the pickup 51, the objective lens is held by a biaxial unit for movement along the tracking direction and along the focusing direction.

The optical pickup 51 in its entirety is movable by a sled mechanism 53 along the radial direction of the disc.

The laser diode in the optical pickup 51 is driven for emitting the laser light by a drive signal (drive current) from a laser driver 63.

The information on the reflected light from the disc 1 is detected by the photodetector within the optical pickup 51 and sent as an electrical signal proportionate to the received light volume to a matrix circuit 54.

The matrix circuit 54 includes e.g. a current/voltage converter and a matrix calculation/amplifier circuit, in association with the output current from the plural light receiving elements, as photodetector, and generates needed signals by the matrix calculation processing.

For example, the matrix circuit 54 generates high frequency signals (replay data signals) corresponding to the replay data, as well as focusing error signals and tracking error signals for servo control.

The matrix circuit also generates push-pull signals, that is, signals pertinent to groove wobbling, or wobbling detecting signals.

The matrix circuit 54 is sometimes built as one within the optical pickup 51.

The replay data signals, output from the matrix circuit 54, are supplied to a reader/writer circuit 55. The focusing error signals and tracking error signals are sent to a servo circuit 61, while the push-pull signals are sent to a wobble circuit 58.

The reader/writer circuit 55 performs binary coding on replay data signals, while performing replay clock generating processing by the PLL. The reader/writer circuit reproduces data read out by the optical pickup 51 to send the reproduced data to a modem 56.

The modem 56 includes a functional part as a decoder for replay and a functional part as an encoder for recording.

In replay, run-length limited codes are demodulated, as the decoding processing, based on the replay clocks.

An ECC encoder/decoder 57 performs the ECC encoding of appending the error correction codes during recording, while performing ECC decoding of error correction during replay.

During replay, data demodulated by the modem 56 are taken into an internal memory and subjected to error detection/correction and deinterleaving to produce reproduced data.

The data decoded to the reproduced data by the ECC encoder/decoder 57 is read out under a command from a system controller 60 and transmitted to a host device, connected in circuit, such as an AV (audio-visual) system 120.

The push-pull signals, output from the matrix circuit 54 as a signal pertinent to the groove wobbling, are processed in the wobble circuit 58. The push-pull signals, as the ADIP information, are demodulated by the wobble circuit 58 into a data stream, forming an ADIP address, so as to be supplied to and address decoder 59.

The address decoder 59 decodes the data supplied to generate an address value which then is supplied to the system controller 60.

The address decoder 59 also generates clocks, by the PLL processing employing the wobble signals, supplied from the wobble circuit 58, to send the so generated clocks to various components as encoding clocks during recording.

The push-pull signals, as the push-pull signals output from the matrix circuit 54, as the signals pertinent to groove wobbling, and as the pre-recorded information PIC, are band-pass filtered by the wobble circuit 58, so as to be supplied to the reader/writer circuit 55. The push-pull signals are then binary-coded to form a data bit stream which is then ECC decoded and deinterleaved by the ECC encoder/decoder 57 to extract data as the pre-recorded information. The so extracted pre-recorded information is sent to the system controller 60.

The system controller 60 is able to perform various operation setting processing or copy-protect processing operations, based on the read-out prerecorded information.

During recording, the recording data is transmitted from an AV system 120 as host unit. These recording data are sent to a memory in the ECC encoder/decoder 57 for buffering.

In this case, the ECC encoder/decoder 57 appends the error correction codes or subcodes, or performs interleaving, by way of encoding the buffered recording data.

The ECC encoded data are modulated by the modem 56 by, for example, the RLL (1-7) PP system, and thence supplied to the reader/writer circuit 55.

As the encoding clocks, as reference clocks for the encoding processing during the recording, clocks generated from the wobble signals, as described above, may be used.

The recording data, generated by the encoding processing, are processed in the reader/writer circuit 55 by fine adjustment of the optimum recording power or adjustment of the laser driver pulse waveform, with respect to the characteristics of the recording layer, spot shape of the laser light or the recording linear velocity, so as to be then routed as laser drive pulses to a laser driver 63.

The laser driver 63 applies the supplied laser drive pulse to a laser diode in the optical pickup 51 to effect laser light emission driving. In this manner, the pits corresponding to the recording data are formed on the disc 1.

The laser driver 63 includes a so-called APC circuit (auto power control) and manages control to render the laser output constant without dependency on e.g. the temperature, as the laser output power is monitored by an output of the laser power monitor detector provided within the pickup 51. The target value of the laser output during recording and reproduction is supplied from the system controller 60, and the laser output level is controlled to be the target value during recording and reproduction.

The servo circuit 61 generates various servo drive signals, such as focusing, tracking and sled servo drive signals, from the focusing and tracking error signals from the matrix circuit 54, in order to execute the servo operations.

That is, the focusing drive signals and the tracking drive signals are generated, responsive to the focusing error signals and the tracking error signals, to drive the focusing coil and the tracking coil of the biaxial mechanism within the optical pickup 51. In this manner, the optical pickup 51, matrix circuit 54, servo circuit 61 and the tracking and focusing servo loops by the biaxial mechanism are formed.

The servo circuit 61 is responsive to a tracking jump command from the system controller 60 to turn off the tracking servo loop to output a jump drive signal to carry out the track jump operations.

The servo circuit 61 generates sled drive signals, based on a sled error signal, obtained as a low range component of the tracking error signal, or on the access execute control from the system controller 60, in order to drive a sled mechanism 53. This sled mechanism 53 includes a main shaft for holding the optical pickup 51, a sled motor and a transmission gearing, not shown, and drives the sled motor responsive to the sled drive signals to effect the needed slide movement of the optical pickup 51.

A spindle servo circuit 62 performs control for rotationally driving the spindle motor 52 at CLV.

The spindle servo circuit 62 acquires clocks, generated by PLL processing on the wobble signals, as the information on the current rotational speed of the spindle motor 52, and compares the clocks to the preset reference CLV speed to generate spindle error signals.

During the data reproduction, the replay clocks generated by the PLL of the reader/writer circuit 55 (reference clocks for decoding processing) become the information on the current rotational speed of the spindle motor 52. Thus, the clocks may be compared to the preset CLV reference speed information to generate spindle error signals.

The spindle servo circuit 62 outputs a spindle drive signal, generated responsive to the spindle error signal, to cause CLV rotation of the spindle motor 52.

The spindle servo circuit 62 also generates spindle drive signals, responsive to a spindle kick/brake control signal from the system controller 60, to execute the operations of start, stop, acceleration and deceleration of the spindle motor 52.

The various operations of the servo system and the recording and/or reproducing system, described above, are controlled by the system controller 60 formed by the microcomputer.

The system controller 60 executes various processing operations responsive to commands from the AV system 120.

For example, if a write command is issued from the AV system 120, the system controller 60 causes movement of the optical pickup 51 to the address for writing. The system controller 60 then causes the ECC encoder/decoder 57 and the modem 56 to execute the encoding processing on the data transmitted from the AV system 120 (video data or audio data of various systems, such as MPEG2). The recording is carried out by the laser drive pulses sent from the reader/writer circuit 55 to the laser driver 63 as described above.

Moreover, if a read command requesting the transfer of certain data (e.g. MPEG2 video data) recorded on the disc 1 is supplied from e.g. the AV system 120, the seek operation control is exercised with the specified address as target. That is, a command is issued to the servo circuit 61 to cause the access operation of the optical pickup 51 to be executed with the address specified by the seek command as a target.

The system controller then performs operation control needed for transmitting the data of the specified domain to the AV system 120. That is, the system controller reads out data from the disc 1 to cause the reader/writer circuit 55, modem 56 and the ECC encoder/decoder 57 to execute decoding/buffering to transmit the requested data.

During recording and/or reproducing these data, the system controller 60 may exercise control on the recording and/or reproducing operations or accessing, using the ADIP addresses detected by the wobble circuit 58 and the address decoder 59.

At a preset timing, such as on loading the disc 1, the system controller 60 reads out the unique ID recorded on the BCA of the disc 1, if such BCA has been formed, or the prerecorded information (PIC), recorded as the wobbling groove in the replay-only area.

In this case, the system controller exercises control on the seek operation with the prerecorded data zone PR as a target. That is, the system controller issues a command to the servo circuit 61 to cause the servo circuit to execute the access operations of the optical pickup 51 towards the innermost rim of the disc.

The system controller then causes the optical pickup 51 to execute replay trace operations to acquire push-pull signals as the reflected light information. The system controller then causes the wobble circuit 58, reader/writer circuit 55 and the ECC encoder/decoder 57 to execute the decoding to acquire the replay data as the prerecorded information or the BCA information.

The system controller 60 performs laser power setting or copy protect processing, based on the prerecorded information or the BCA information thus read out.

FIG. 14 shows a cache memory 60a within the system controller 60. This cache memory 60a is used for holding or updating the TDFL/space bitmap read out from the TDMA of the disc 1.

The system controller 60 controls relevant units, e.g. on loading of the disc 1, to read out the TDFL/space bitmap recorded on the TDMA, to hold the so read-out information on the cache memory 60a.

If then the exchange processing is carried out by data write or defects, the system controller updates the TDFL/space bitmap within the cache memory 60a.

If exchange processing is carried out by data write or data rewrite operations, and the space bitmap or the TDFL is updated, the TDFL or the space bitmap may be additionally recorded in the TDMA of the disc 1 each time the updating is performed. However, in such case, the TDMA of the disc 1 is excessively consumed.

For this reason, the TDFL/space bitmap is updated in the cache memory 60a until the disc 1 is ejected from the disc drive device or until a command is issued from the host device, as an example. The last (that is, the latest) TDFL/space bitmap in the cache memory 60a is written in the TDMA of the disc 1, such as at the time of ejection. In this case, a large number of update events of the TDFL/space bitmap may be collectively updated on the disc 1, thus reducing the consumption of the TDMA of the disc 1.

On the other hand, if the TDMA of the disc 1 is updated only at the time of ejection or on receipt of a command from the host device, it may be feared that the chance of the update operations is smaller. During the time period from the recording of the user data on the disc 1 until the updating of the TDMA on the disc 1, the state of user data recording and the TDMA are not matched to each other on the disc 1. It is not desirable that such time period is prolonged. Thus, in the present embodiment, the chance of updating the TDMA on the disc 1 is kept even in case the gap is generated or extinct, responsive to the recording of the user data, as will be explained subsequently.

Meanwhile, in the illustrative structure of the disc drive device of FIG. 14, the disc drive device is connected to the AV system 120. Alternatively, a personal computer, as the disc drive device of the present invention, for example, may be connected as a host device.

Still alternatively, the disc drive device may not be connected to other equipment. In this case, the operating unit or the display unit may be provided, or the data input/output interfacing unit may differ in structure form that shown in FIG. 14. In short, it is sufficient if the recording and/or reproduction is carried out responsive to the user's operations, or if a terminal unit for input/output of various data is formed.

5. Generation and Extinction of Gap

In the present embodiment, the generation and extinction of the gap is the chance of TDMA updating on the disc 1. First, the gap is explained.

The gap in the context of the present embodiment means an unrecorded area generated in a region up to an address on a recording medium specified by the LRA as the last recording position information of the user data, that is, in a region on the radially inner side of the LRA in the user data area.

Since the LRA is the address of the last recording sector of the prerecorded region on the radially outermost side in the user data area, the gap is the unrecorded region ahead of the recorded region in the user data area.

In general, the user data is recorded in a padded fashion from the inner rim side of the write-once disc, the gap herein defined is usually not generated. However, with the optical disc 1 of the present embodiment, random accessibility is assured by employing the space bitmap, such that the user data need not be recorded in a padded fashion from the inner rim, and hence the chance of generation of what is termed the gap in the present embodiment.

Referring to FIGS. 15A to 15E, a typical status of gap generation and extinction is now explained. FIGS. 15A to 15E show the transition of the recording states of the user data area on the disc.

Figure 15A:
FIGS. 15A to 15E illustrate the generation and extinction of a gap according to the present invention.

FIG. 15A shows the state of a blank disc where no user data has been recorded. In this case, the user data area in its entirety is an unrecorded area. This is not the gap in light of the above definition. That is, in this state, there is no gap.

Figure 15B:

FIG. 15B shows the state in which the user data has been recorded from a location which is partway on the disc in FIG. 15A. This recorded area is termed a recorded area #1.

In this case, the last sector address of the recorded area #1 is the LRA. Hence the unrecorded area on the radially inner side of the recorded area #1 is the gap. That is, the gap is generated.

Meanwhile, the unrecorded area on the radially outer side of the recorded area #1 is not the gap.

Figure 15C:
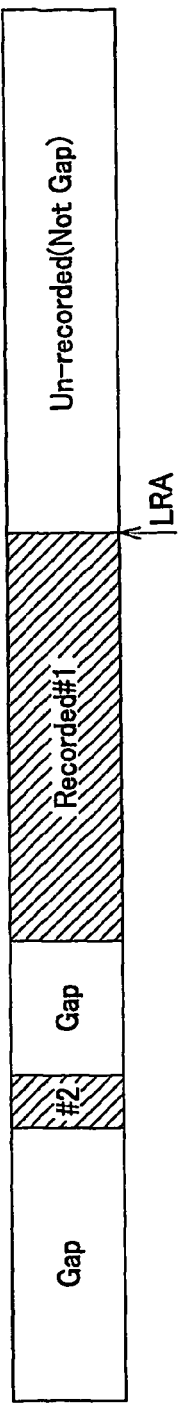

FIG. 15C shows the state in which the user data has been recorded partway in the gap in the state of FIG. 15B. This recorded region is a recorded area #2. In this case, the gap is split into two, and a new gap has been generated by this splitting.

It is noted that, since the user data has not been recorded on the radially outer side of the recorded area #1, the LRA is not changed.

Figure 15D:
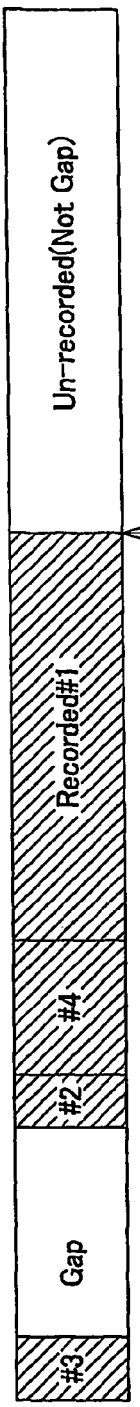

FIG. 15D shows the state in which the user data has been recorded at the leading end of the user data area, from the state of FIG. 15C to form a recorded area #3. The user data is recorded in a gap between the recorded area #1 and the recorded area #2 to form a recorded area #4.

As to the recorded area #3, the user data has been recorded at a portion of the gap, which has existed, from the leading end thereof, and thus this does not cause a new gap to be generated.

The gap which has existed has been padded with the user data, by the recorded area #4. This represents gap extinction.

Meanwhile, in this case of FIG. 15D, the LRA again is not changed, because no user data has been recorded on the radially outer side of the recorded area #1.

Figure 15E:
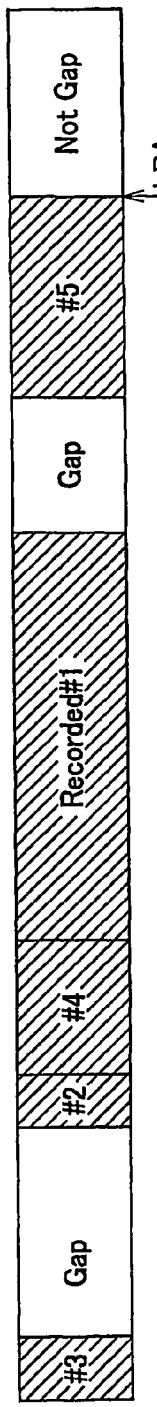

FIG. 15E shows a state in which user data has been recorded partway in the unrecorded area (not the gap), on the radially outer side of the LRA, starting from the state of FIG. 15D. This recorded area is the recorded area #5. In this case, an unrecorded area exists on the radially inner side of the recorded area #5. Thus, the unrecorded area becomes a new gap.

Further, in this case, since the user data has been recorded at radially outer side of the recorded area #1, the LRA is updated to the address of the last recording sector of the recorded area #5.

The gap is generated or extinct, responsive to the recording of the user data, as described above as an example. In the present embodiment, when the gap has been generated or become extinct in this manner, the management information stored in the cache memory 60a, that is, the information of the TDMA (viz. the TDFL/space bitmap), is written on the disc 1.

6. TDMA Updating 6-1 Updating Responsive to Gap Generation and Extinction

The processing for updating the TDMA of the disc 1 is hereinafter explained.

Among the contents of the TDMA, there are the space bitmap and the TDFL, as described above. In case data is recorded, the space bitmap is necessarily updated. On the other hand, in case of the exchange processing due to defects or data rewriting, the contents of the TDFL are updated.

Moreover, in the space bitmap or TDFL, the TDDS is recorded in the last sector, and the LRA is included in the TDDS.

It is noted that the information within the TDMA is updated as necessary. In the following explanation, the case of updating, on the disc 1, the space bitmap (including the TDDS having the LRA), necessarily changed responsive to data recording, is taken as an example.

If the exchange processing in the data recording has been carried out, and the TDFL updating is needed, such updating is carried out simultaneously with the updating of the space bitmap. In the following, this is not referred to individually.

In the present embodiment of the disc drive device, the contents of the space bitmap, recorded in the cache memory 60a, are necessarily updated responsive to the recording of user data on the disc. That is, the cluster, in which recording has been made, is set to '1', by way of updating. If the LRA has been changed, the value of the LRA in the TDDS of the last sector of the space bitmap is updated.

Thus, the contents of the space bitmap, stored in the cache memory 60a, are matched to the prevailing user data recording state.

On the other hand, the updating of TDMA in the disc 1 (mainly the additional updating of the space bitmap in the TDMA) is not carried out each time the user data is recorded.

In the present embodiment, there are following four chances of recording the latest space bitmap stored in the cache memory 60a on the disc 1:
 a case in which a gap has been generated by user data recording;
 a case in which a gap has become extinct by user data recording;
 a case in which the disc 1 is ejected; and
 a case in which an update command has been issued from a host.

Here, the processing of updating the TDMA of the disc 1 in case a gap has been produced or become extinct by user data recording, that is, the processing at the time of the user data recording, is explained.

Meanwhile, each processing, hereinafter explained, is the processing performed by the system controller 60.

Figure 16:
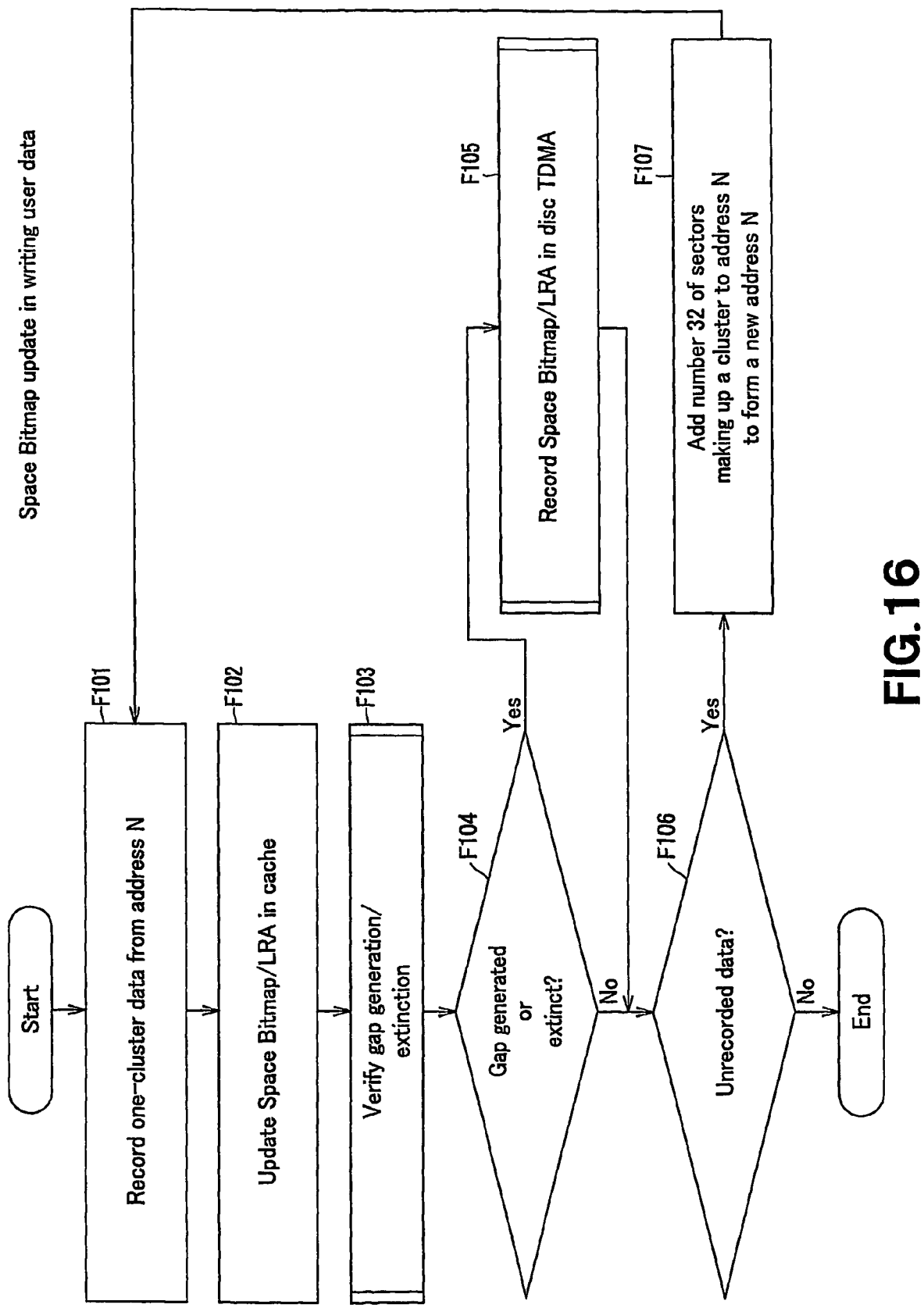
FIG. 16 is a flowchart illustrating the processing in writing user data according to the present invention.

FIG. 16 shows the processing at the time of the user data recording.

It is now assumed that a user data write request for a certain address N has arrived from a host device, such as AV system 120, to the system controller 60.

In this case, the processing of FIG. 16 is carried out in the system controller 60. First, in a step F101, processing for data recording is carried out responsive to a request from a host.

This recording processing is carried out on the cluster basis.

Although the detailed sequence of the data recording processing of the step F101 is not shown, the system controller 60 executes the following processing as the processing in the step F101.

First, as reference is made to the space bitmap in the cache memory 60a, the system controller checks whether the address (cluster) specified for data writing from the host has been recorded or has not been recorded.

If the address (cluster) has not been recorded, the processing of recording the user data, supplied from the host, in the specified address, is carried out.

If conversely the specified address has been recorded, the present data cannot be written in the specified address. Thus, data rewriting is carried out by exploiting the exchange processing function. That is to say, it is first checked, using the ISA and the OSA, whether or not the exchange processing is possible. If the exchange processing is possible, the present user data is recorded in the ISA or in the OSA. Specifically, the recording is carried out in the cluster in the ISA or OSA, in place of recording in the address N, and management is performed so that the address N will be exchanged to a cluster in the ISA or OSA. In this case, the TDFL is also updated at the time of updating the space bitmap in the next step F102.

If data has been written in the step F101 in the address N, the space bitmap is updated in a step F102 in the cache memory 60a, in order that the cluster N where data has been written is indicated as such.

If the cluster N is on the outermost rim of the user data, the LRA in the TDDS of the last sector of the space bitmap is also updated.

Then, in a step F103, it is verified whether or not the gap explained with reference to FIG. 15 has been generated or has become extinct as a result of the write processing in the above step F101.

Figure 17:
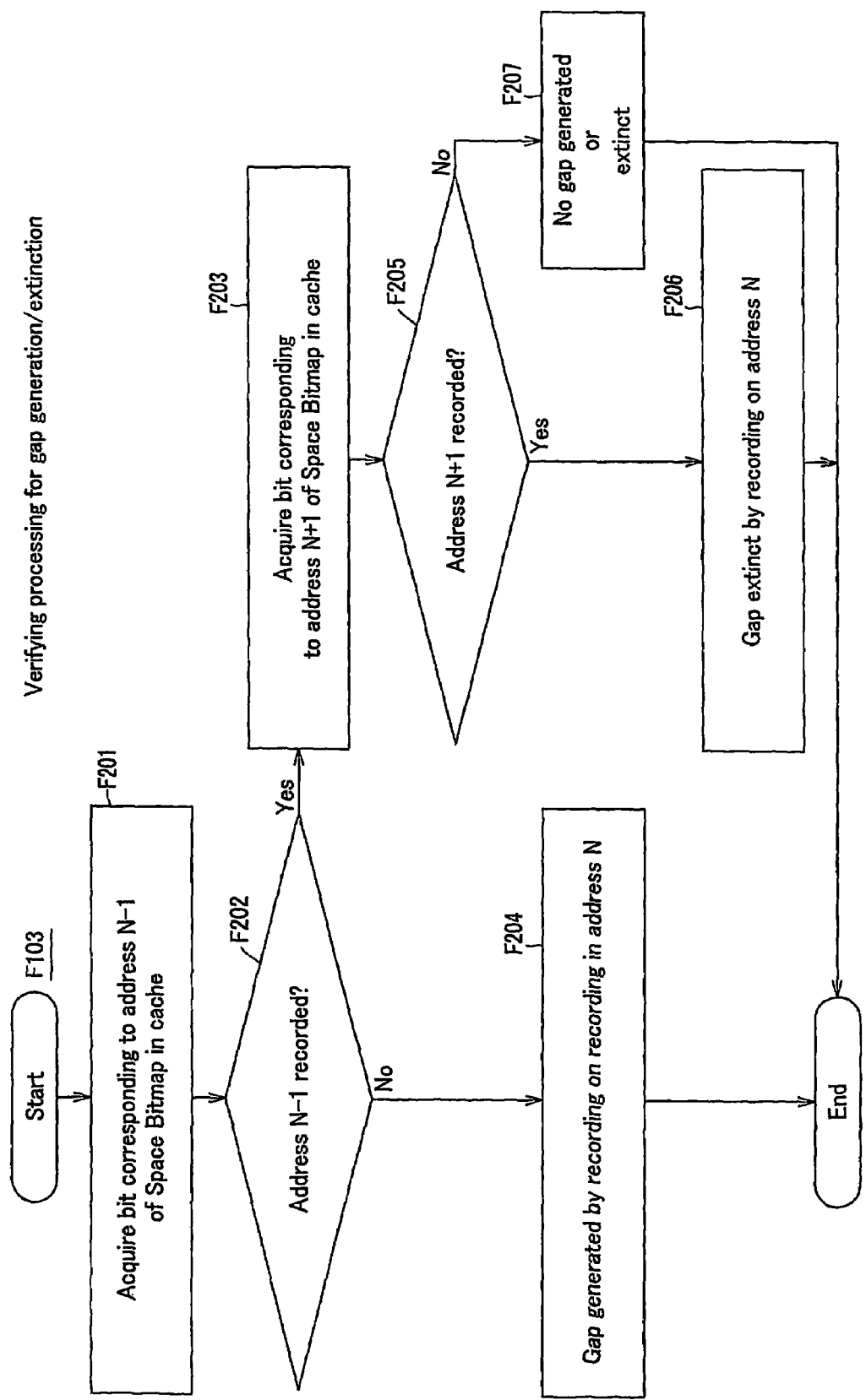
FIG. 17 is a flowchart illustrating the processing in giving a judgment as to gap generation according to the present invention.

The processing in this step F103 is shown in detail in FIG. 17.

First, in a step F201, a bit corresponding to an address N−1 in the space bitmap within the cache memory 60a, that is, the space bitmap updated in the directly previous step P102, is acquired. In a step F202, it is checked whether the bit corresponding to the address N−1 is '1' or '0'. That is to say, it is checked whether or not the cluster directly previous to the currently recorded cluster of the address N has already been recorded.

If the address N−1 is unrecorded, an unrecorded area has been generated in an area on the radially inner side of the current data write position. Thus, the system controller proceeds to a step P204 to verify that the gap has been generated with the current data write event.

If conversely the address N−1 in the step F202 is recorded, the bit corresponding to the address N+1 is acquired in the next step F203 in the space bitmap. In a step F205, it is checked whether or not the bit corresponding to the address N+1 is '1' or '0' to verify whether or not the currently recorded cluster next following the cluster of the address N is a recorded cluster.

If the address N+1 is already recorded, it may be verified that the clusters ahead and in rear of the currently recorded cluster has already been recorded, that is, that the currently recorded address N has so far been a gap. It may further be verified that the gap has now been padded by the current recording. Hence, it may be verified in the step F206 that the gap has become extinct by the current recording.

If, in the step F205, the address N+1 is unrecorded, it may be verified in a step F207 that gap generation or extinction has not occurred with the current recording.

After verifying whether or not the gap generation or extinction has occurred, by the processing of FIG. 17, the processing is branched at a step F104 in FIG. 16, depending on the results.

If no gap generation or extinction has occurred, it is checked in a step F106 whether or not there is any unrecorded data, that is, any data requested to be recorded from the host. If there is any such data, the address is added by the number of the sectors, which is 32, to give a new address N. That is, the next cluster is the write address.

The system controller reverts to the step F101 to record data in the address N.

If the gap has newly been generated or has become extinct in the step F104, the system controller proceeds to the step F105 to write the space bitmap/LRA in the cache memory 60a at the time point, that is, the space bitmap updated in the step F102, on the TDMA on the disc.

Figure 18:
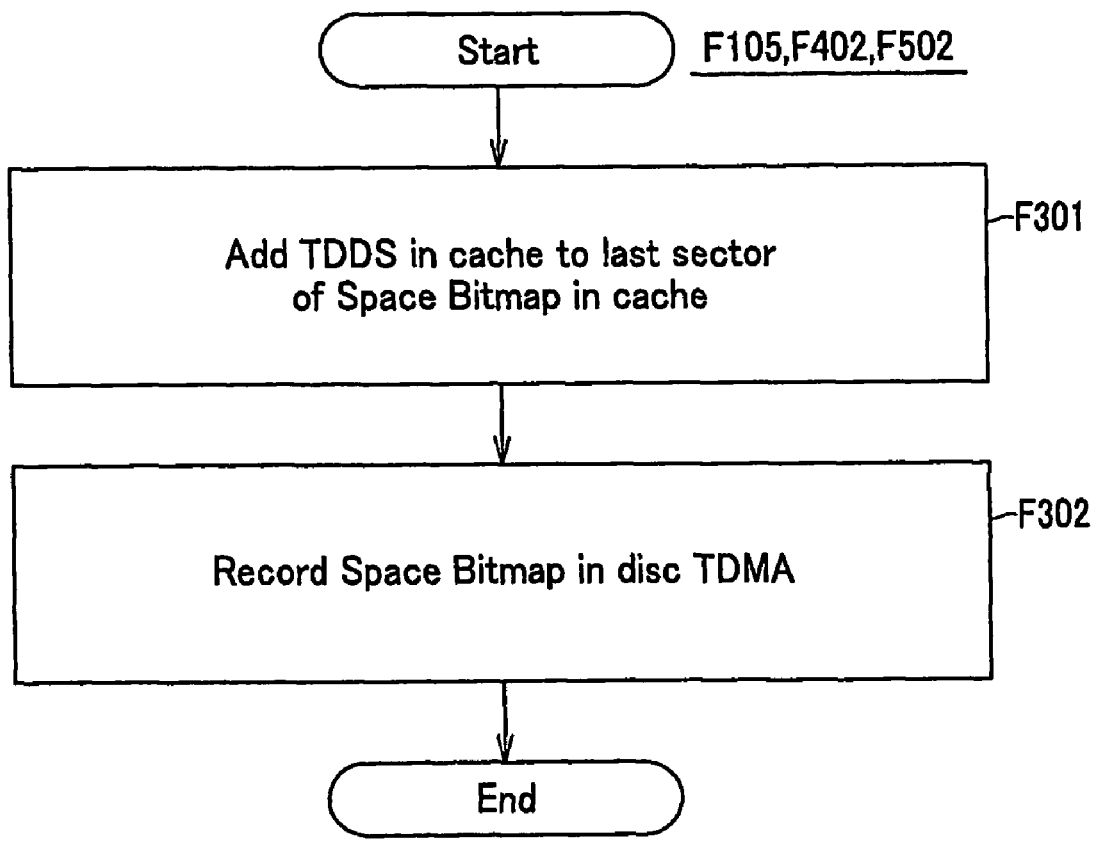
FIG. 18 is a flowchart illustrating the processing in recording the space bitmap and the LRA on the disc according to the present invention.

The processing in this step F105 is shown in detail in FIG. 18.

First, in a step F301, the TDDS information of FIG. 12, held in the cache memory 60a (information for one sector inclusive of LRA) is added as the last sector of the space bitmap in the cache memory 60a.

In a step F302, the space bitmap, added by the TDDS, is additionally recorded in the TDMA of the disc 1 (see FIG. 9).

The above processing is carried out until it is confirmed that data unrecorded in the step F106 has become depleted.

Thus, if a data write request for one cluster is made from e.g. the host, and the gap has been generated or become extinct directly after recording the user data of the first one cluster, the TDMA of the disc 1 is updated.

If a data write request for two or more clusters is made from e.g. the host, and the gap has been generated or become extinct directly after recording the user data of the first one cluster, the TDMA of the disc 1 is updated at a time point directly after the writing of the first cluster. The recording of user data of the second and the following clusters is then continued. Of course, if the gap has been generated or has become extinct by the recording of the second and the following clusters, the TDMA of the disc 1 is updated.

6-2 Updating at the Time of Disc Ejection

The TDMA updating on the disc 1 (additional recording to the space bitmap) is also carried out at the time of the disc ejection.

Figure 19:
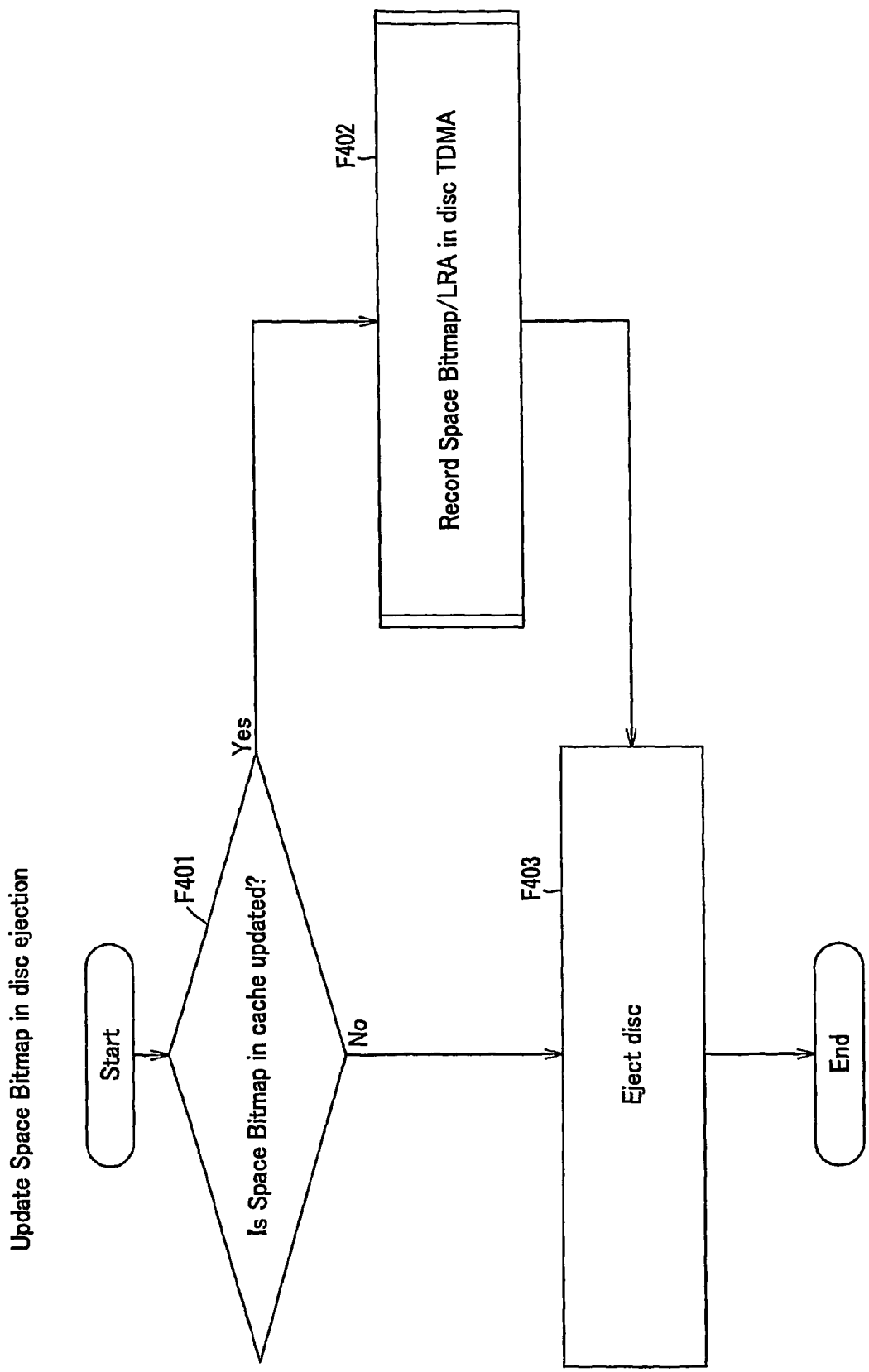
FIG. 19 is a flowchart illustrating the processing in recording the space bitmap and the LRA on the disc at the time of ejection according to the present invention.

FIG. 19 shows the processing by the system controller 60 in case of ejecting the disc 1 from the disc drive device.

If the disc is ejected by a user operation or under a command from the host, the system controller 60 checks, in a step F401, whether or not the space bitmap has been updated in the cache memory 60a.

Lacking the updating of the space bitmap, the system controller proceeds to a step F403 to manage control to eject the disc 1. In this case, the disc 1 loaded is ejected without data recording thereon even once.

In case the space bitmap has been updated in the cache memory 60a, the space bitmap, inclusive of the LRA, is additionally recorded in a step F402 in the TDMA of the disc 1. This is tantamount to the execution of the processing of FIG. 18. After the updating of the TDMA, control is managed in a step F403 that the disc 1 is to be ejected.

6-3 Updating Responsive to Command from Host

The updating of the TDMA on the disc 1 (additional recording of the space bitmap) is also performed responsive to a command from the host.

Figure 20:
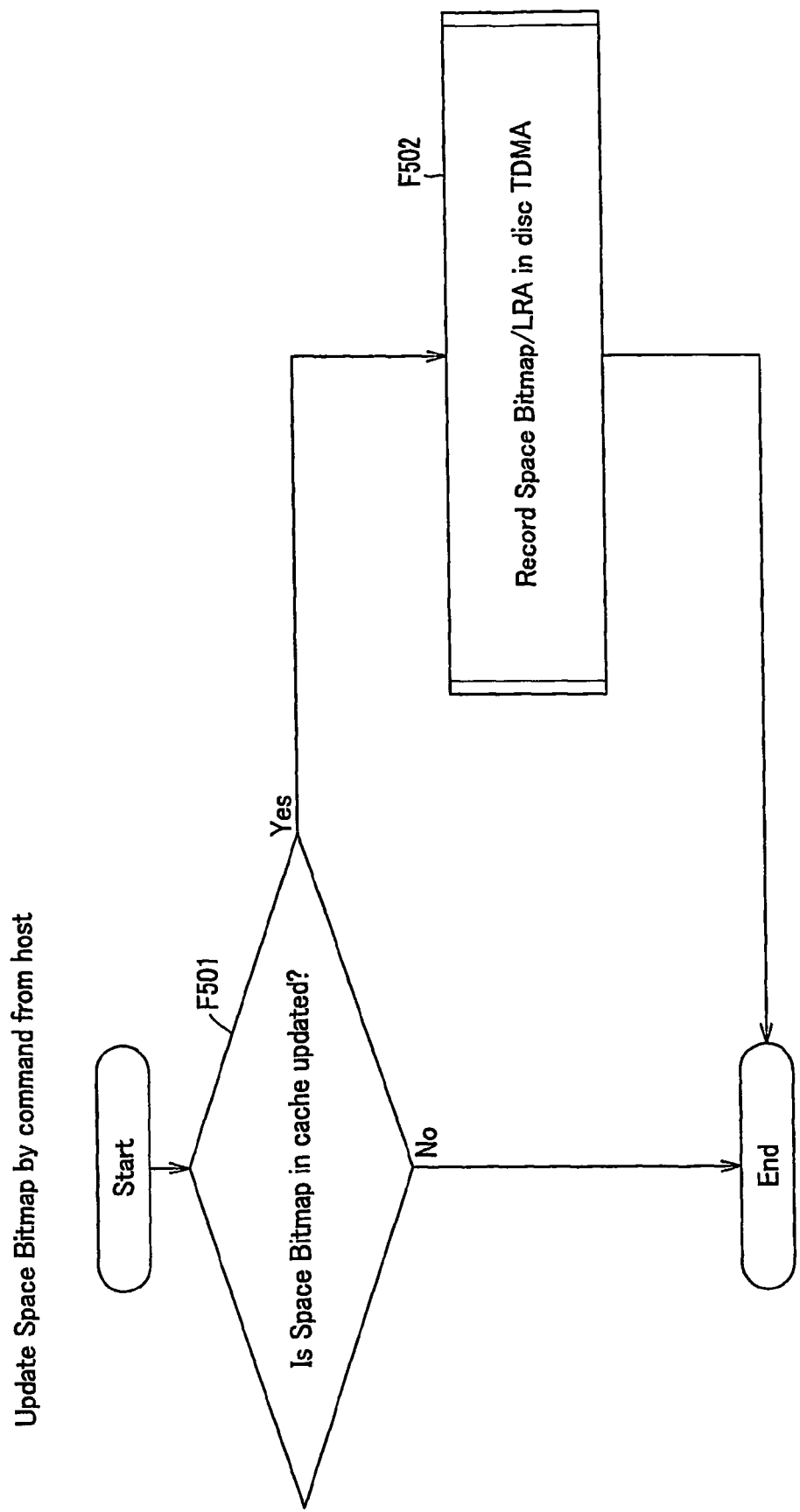
FIG. 20 is a flowchart illustrating the processing in recording the space bitmap and the LRA on the disc under commands from a host according to the present invention.

FIG. 20 shows the processing by the system controller 60 in case a command has been made for updating the TDMA from the host.

In case the command has been made for updating the TDMA from the host, the system controller 60 in a step F501 checks to see whether or not the space bitmap has been updated in the cache memory 60a.

Lacking the updating of the space bitmap, the processing is terminated without updating the disc 1. This is tantamount to the case in which no data recording has been made on the disc 1 loaded and a command for updating has been issued from the host.

If conversely the space bitmap has been updated in the cache memory 60a, the space bitmap, inclusive of the LRA, is additionally recorded in a step F502 in the TDMA of the disc 1. This is tantamount to the processing of FIG. 18 described above.

7. Processing of Verifying the Matching

In the present embodiment, described above, the TDMA on the disc 1 is updated by gap generation or extinction, disc ejection or by a command from the host.

In particular, since the TDMA is updated by the gap generation or extinction, a moderate number of times of the updating operations may be realized.

Moreover, since the TDMA on the disc 1 is updated responsive to the gap generation or extinction, it is possible to verify the matching between the TDMA contents on the disc 1 and the state of recording of the user data by verifying the matching of the gap and the LRA on e.g. power up or disc loading.

In addition, if it is verified that the matching has not been achieved due to previous power down, for example, it is only sufficient to update the space bitmap/LRA to a correct state by the cache memory 60a for restoration to the normal state.

Figure 21:
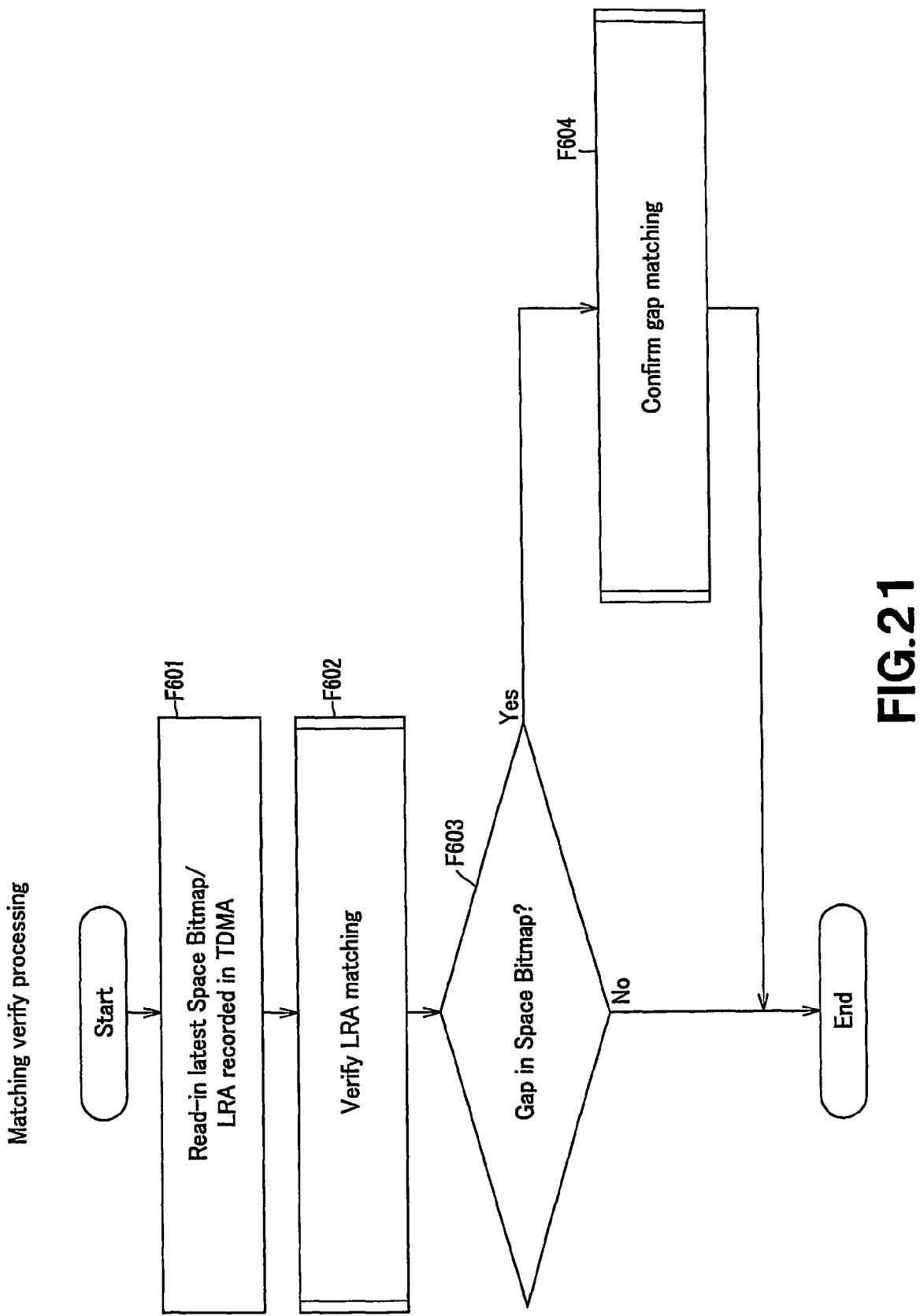
FIG. 21 is a flowchart illustrating the processing in verifying the matching according to the present invention.

Hence, if the power supply of the disc drive device is verified to be in an on-state, the processing of verifying the matching of FIG. 21 is carried out.

Meanwhile, this processing of FIG. 21 may be carried out not only when the power supply is in the on-state, but also on loading the disc 1.

If, as the disc 1 remains loaded, the power supply is turned off and subsequently turned on, the disc 1 has already been loaded at such time point, so that the processing of FIG. 21 is performed. If the disc has not been loaded when the power supply is on, the processing of FIG. 21 is naturally not performed.

The power supply being turned off with the disc 1 remaining loaded refers both to the case of the power supply off as the regular operation but also to the case of the accidental power supply off due to power supply interruption, malfunctions in the system operation or an error on the part of an operator such as inadvertent extraction of a plug from a socket.

First, in a step F601, the latest space bitmap or TDFL, recorded in the TDMA of the disc 1, are read out and taken into the cache memory 60a. The latest LRA is present in the TDDS of the last sector of the TDFL or the space bitmap.

In a step F602, it is checked whether or not the LRA, read out from the disc 1 and taken into the cache memory 60a, is matched in actuality as the LRA of the user data area of the disc 1.

Figure 22:
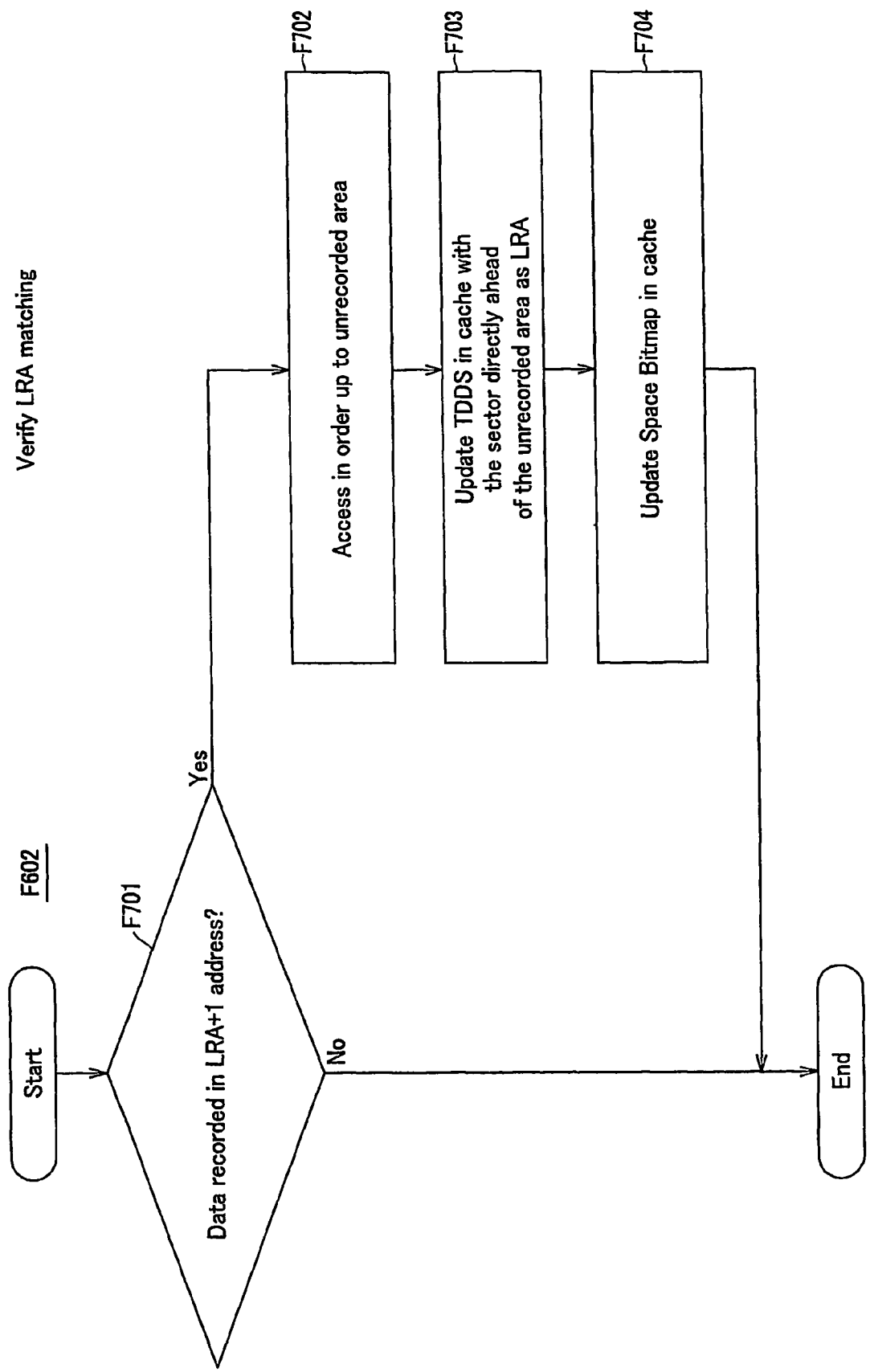
FIG. 22 is a flowchart illustrating the processing in confirming the LRA matching according to the present invention.

This processing of verifying the matching is shown in detail in FIG. 22.

First, in a step F701, it is checked whether or not data has actually been recorded in an address of LRA+1 (that is, the address next to the LRA) on the disc 1.

If the processing at the time of recording the user data is carried out as shown in FIG. 16, the space bitmap or the LRA has been updated responsive to the gap generation or extinction, and the address LRA+1 is unrecorded in this step F701, it may be verified that the LRA as read out is correct.

The reason is that, for example, even if power supply interruption has accidentally occurred during the recording of the recorded area #5 of FIG. 15(e), the TDMA is updated by the processing of step F105 of FIG. 16 directly after recording of the first cluster of the recorded area #5.

If, in this manner, the LRA matching is correct, the processing of verifying the matching is directly terminated.

If, however, the address of the LRA+1 has been determined in the step F701 to be already recorded, the state of LRA matching is not correct. That is, the user data has been recorded next to the LRA which should be the last address of the user data.

In such case, the LRA read into the cache memory 60a by the steps F702 to F704 is repaired or matched.

That is, in the step F702, LRA+2, LRA+3 and so forth are actually reproduced on the disc, next to the LRA+1, to search an unrecorded area. If the address LRA+n is an unrecorded area, the address directly previous thereto, that is, the address LRA+(n−1), is the inherent LRA. Thus, in the step F703, the value of the LRA in the TDDS, taken into the cache memory 60a, is updated to LRA+(n-1), which is the inherent LRA value.

Then, even though recording has been made for the LRA+1 up to LRA+(n−1), such state is not reflected in the space bitmap.

Hence, in a step F704, the space bitmap, read out from the disc 1 and taken into the cache memory 60a, is updated so that these addresses are prerecorded.

This completes the processing of confirming the LRA matching. Meanwhile, the update processing of steps F703 and F704 is, after all, the updating within the cache memory 60a, but does not update the TDMA in the disc 1 at this time point.

In the steps F702 and F703, the consecutive addresses on the disc, namely LRA+1 followed by LRA+2, LRA+3 and so forth, are reproduced to search an unrecorded area, and an address directly previous to the unrecorded area is retained to be a correct LRA. The reason is that, in case the processing of FIG. 16 is carried out during recording of the user data, there is produced no unrecorded area (gap) between the LRA in TDMA and the actual LRA, that is that, if the LRA written in TDMA on the disc 1 is not matched to the actual user data recording state, the actual LRA necessarily becomes the trailing end of the prerecorded area consecutive from the address specified by the LRA written in TDMA.

If the processing of verifying the matching of LRA shown in FIG. 22 has been carried out as the step F602 of FIG. 21, the space bitmap, taken into the cache memory 60*a*, is confirmed in the next step F603, in order to verify whether or not a gap is retained to exist in the space bitmap.

That is to say, it is verified on the space bitmap whether or not there exist one or more clusters or sets of clusters which are unrecorded areas in addresses on the radially inner side of the LRA.

If no gap is retained to exist on the space bitmap, the processing of FIG. 21 is terminated.

If conversely the gap is retained to exist, the processing of verifying the gap matching is carried out in a step F604. This is the processing of confirming whether or not the area retained to be a gap on the space bitmap is actually a gap.

Figure 23:
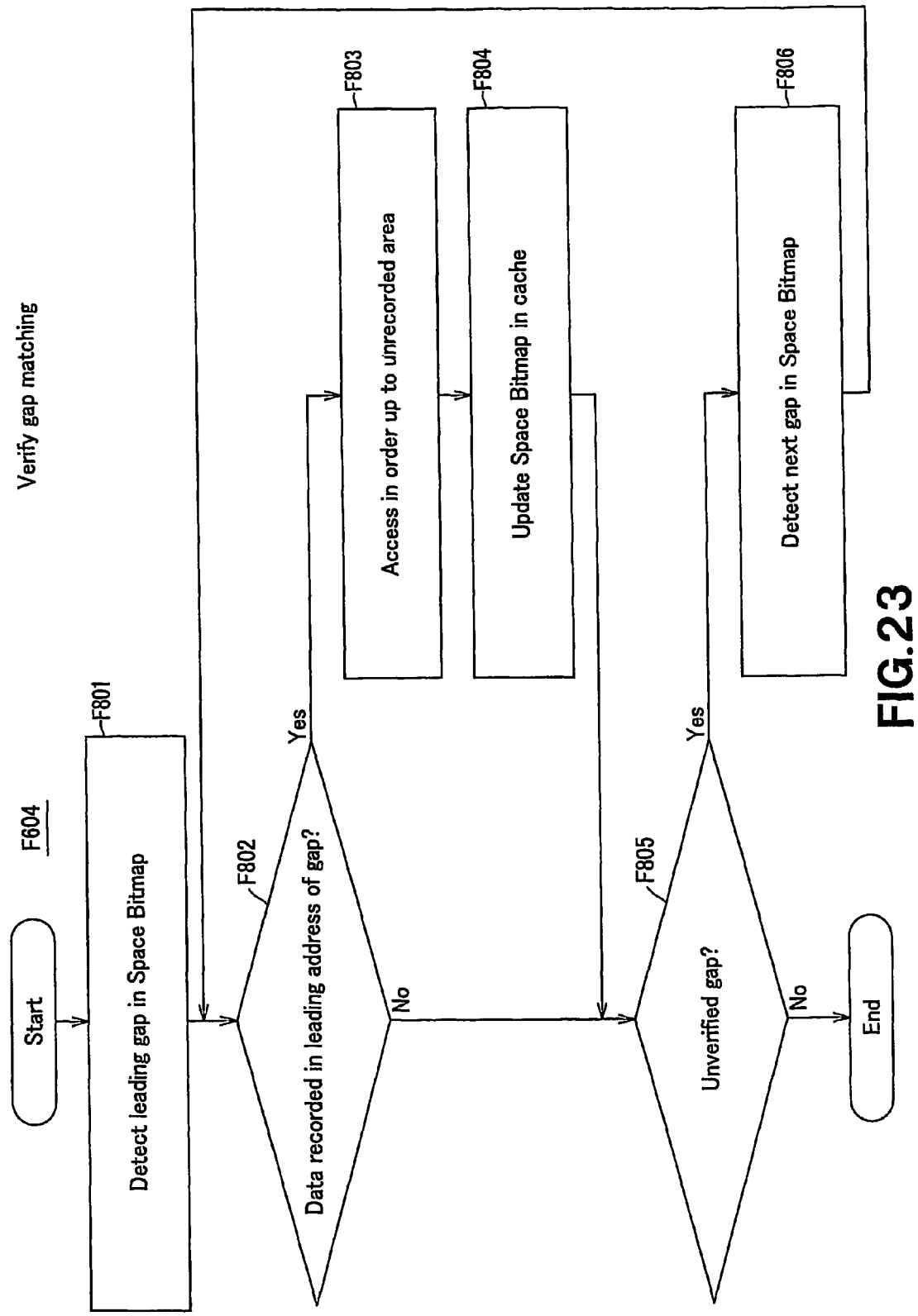
FIG. 23 is a flowchart illustrating the processing in confirming the gap matching according to the present invention.

This processing is shown in detail in FIG. 23.

First, in a step F801, the leading end gap in the area retained to be the gap in the space bitmap in the cache memory 60*a* is grasped.

In a step F802, the leading address of the gap is accessed and data is read out therefrom to verify whether or not the address in question is actually unrecorded. If the address actually represents a gap, the address should be unrecorded.

If the address is unrecorded, it is determined that the gap is matched as on the space bitmap. The system controller then proceeds to a step F805.

In the step F805, it is verified whether or not there is still left an unverified gap in the area retained to be the gap on the space bitmap. If such unverified gap is still left, the address retained to be the next gap on the space bitmap is detected in a step F806.

The system controller proceeds to the step F802 to access and reproduce the gap, in the same way as above, to verify whether or not the gap represents an unrecorded area.

If, in the step F802, data has been recorded in the area retained to be the gap, the gap on the space bitmap is not matched to the actual gap.

Hence, in the steps F803 and F804, the processing of matching the space bitmap is carried out.

First, in the step F803, the area retained to be the gap on the space bitmap is sequentially reproduced, beginning from the leading end thereof, to search an unrecorded area.

If an unrecorded area is found in the region on the space bitmap, retained to be a gap, the region downstream of the unrecorded area is the actual gap.

If the addresses X to X+N on the space bitmap is retained to be a gap (unrecorded region), and in actuality, the addresses X up to X+(N−Y) are already recorded, the actual gap is the region corresponding to the addresses X+(N−y+1) up to X+N.

Thus, in a step F804, the recorded addresses in the region retained to be the gap are updated so as to indicate the prerecorded state on the space bitmap.

Meanwhile, since the TDMA is updated by gap generation or extinction, by the processing of FIG. 16, it does not occur that, in the processing of FIG. 23, the totality of the addresses in a certain region, such as the aforementioned addresses X to X+N, retained to be the gap on the space bitmap, are in the pre-recorded state, such that the gap has become extinct. It also does not occur that, in case the address X+(N−y+1) has been found in the step F803 as an unrecorded area, part of the region from the address X+(N−y+1) up to the address X+N has become recorded and another gap has subsequently been generated.

Hence, it is sufficient if, in the step F803, an unrecorded region is searched in a region from the address X up to the address X+N, and the bit on the space bitmap corresponding to the recorded cluster is corrected to '1' indicating the recorded state.

The processing of verifying the matching of the gap of FIG. 23 is carried out as described above. Meanwhile, the update processing of the step F804 is, after all, the updating within the cache memory 60*a*, but does not update the TDMA of the disc 1 at this time point.

The processing of verifying the matching of FIG. 21, inclusive of the processing of verifying the matching of the LRA and the gap, is carried out as described above.

At a time point when the processing of FIG. 21 has been carried out, the space bitmap and the LRA, recorded in the cache memory 60*a*, are matched to the recording state of actual user data on the disc 1.

As from this time, the space bitmap in the TDMA on the actual disc is updated at the timing of gap generation and extinction, disc ejection and a command from a host, as explained previously.

Meanwhile, the processing of FIG. 21 may be carried out not only during the power supply on state (power supply on state with the disc 1 loaded in position), but also during the time the disc is loaded in position.

Considering that the TDMA is usually updated when the disc is in the ejected state, the space bitmap/LRA is necessarily matched to the actual recording state of the user data when the disc is in the usual loaded state.

However, it may be an occurrence that the disc is forced to be ejected during the time the power supply is accidentally turned off, such that the disc not in the matched state may be loaded in position at a time point after the turning on of the power supply. It may therefore be convenient that the processing of FIG. 21 is carried out when the disc is in the accommodated state.

8. Effect of the Present Embodiment and Modification

In the present embodiment, described above, the space bitmap/LRA is updated in the cache memory 60*a*, responsive to the recording operation of the user data.

On the other hand, the space bitmap/LRA in the cache memory 60*a* is written in the TDMA of the disc 1 at the timing of gap generation and extinction, disc ejection and a command from a host.

If the power supply is turned on as at least the disc 1 is in the loaded state, the processing of verifying the matching is carried out.

From the above, the following favorable results are obtained.

First, since the space bitmap/LRA is recorded in the TDMA on the disc 1 responsive to gap generation/extinction, the TDMA on the disc may moderately be updated during the recording process. That is, the TDMA is updated a moderate number of times, in addition to the TDMA updating at the time of disc ejection or update command from the host. In this manner, the area for the management information is not wastefully consumed because of the excessive TDMS updating, while the period of the non-matched state between the space bitmap/LRA and the user data recording state is not wastefully protracted due to insufficient TDMA updating.

Moreover, since the TDMA is updated on the disc 1 by gap generation or extinction, the matching between the contents of TDMA on the disc 1 and the state of user data recording may be confirmed by detecting whether or not the gap (as indicated on the space bitmap) or the LRA is coincident with the actual gap or the actual LRA on the disc.

Lacking the matching, it is sufficient at such time point if the TDMA is updated for achieving the matching of the LRA or the space bitmap on the cache memory 60a.

The result is the facilitated processing for coping with the non-matching or the decision as to matching.

Since the processing for verifying the matching of FIG. 21 is carried out with the power up, in consideration of the possible error (non-matching) in the management of the recording state, there is no necessity for providing special processing as the processing against possible troubles during the recording, such as power supply interruption during data writing.

If the processing for verifying the matching of FIG. 21 is also carried out when the disc is in the accommodated state, it is possible to restore the matched state, even in such case where a disc in the non-matched state, inadvertently forced to be ejected, or a disc forced to be ejected by another disc drive device (another device on which TDMA update is carried out as in the present embodiment), is loaded in position.

In addition, as may be apparent from the operation of the present embodiment, there is no necessity of saving the pre-update TDMA information, using the nonvolatile memory, in consideration of repairing the non-matching die to accidents.

In particular, in consideration of the frequently updated information, such as the space bitmap, the use of a non-volatile memory, in which limitations are imposed on the number of times of rewriting. In the present embodiment, this problem may be resolved, because there is no necessity for using the non-volatile memory. Of course, the cost of the device may be lowered by dispensing with backup means for the space bitmap/LRA, such as non-volatile memories.

The explanation of the disc of the preferred embodiments and the corresponding disc drive device has been made in the foregoing. The present invention is, however, not limited to these embodiments and may comprise various modifications without departing from the scope of the invention.

For example, one instead of both of the gap generation and the gap extinction may be used.

Although the recording medium of the present invention is supposed to be a write-once single- or double-layer disc, a disc having three or more recording layers may also be used. The present invention also is not limited to a disc type recording medium and may also be applied to a write-once medium other than the disc.

INDUSTRIAL APPLICABILITY

As may be understood from the foregoing, the present invention provides a system, accessible at random, by employing the written/unwritten indicating information (space bitmap) in a write-once medium, in which the management information including the written/unwritten indicating information (space bitmap) and the last recording position information (LRA) indicating the last position of the user recorded data may be updated at an optimum timing on the disc. That is, the management information (space bitmap or LRA) on the disc may moderately be updated in the recording process, in order that the management information may be updated on the disc responsive to the occurrence or extinction of the gap (non-recorded area) in an area ahead of the LRA. That is, in system operations, the area for the management information is not wastefully consumed because of the excessive updating, while the period of the non-matched state between the management information and the user data recording state is not wastefully protracted due to insufficient updating.

Moreover, since the TDMA is updated on the disc by gap generation or extinction, the matching between the management information and the state of user data recording may be confirmed by detecting whether or not the gap in the management information (as indicated on the space bitmap) or the LRA is coincident with the actual gap or the actual LRA on the disc. Lacking the matching, it is sufficient at such time point if the management information is updated for achieving the matching of the LRA or the space bitmap.

The result is the facilitated processing for coping with the non-matching or the decision as to matching. Or, in power supply on, the above processing is performed, whereby there is no necessity for providing special restoration processing as the processing against possible troubles, such as power supply interruption.

Moreover, there is no necessity for saving the pre-update management information using the non-volatile memory.

The invention claimed is:

1. A recording and/or reproducing apparatus for a recording medium in a write-once recording area of which allowing for writing data once the management information and the user data are recorded, and in which the written/unwritten indicating information indicating whether data has been written in each data unit in at least an area for recording said user data and the last recording position information indicating the last position of recording of the recorded user data are recorded as said management information, said apparatus comprising:

a recording and/or reproducing unit for recording and/or reproducing data for said recording medium;

a storage unit for storage of the management information read out from said recording medium; and a controller for updating the contents of the management information stored in said recording unit, responsive to execution of data recording by said recording and/or reproducing unit, and for causing said recording and/or reproducing unit to record the management information, stored in said storage unit, on said recording medium, responsive to generation of an unrecorded area in a range up to a location on said recording medium indicated by said last recording position of said management information.

2. The recording and/or reproducing apparatus according to claim 1, wherein said controller is responsive to extinction of said unrecorded area in said range up to the location indicated by said last recording position information to cause said recording and/or reproducing unit to record the management information stored in said storage unit on said recording medium.

3. The recording and/or reproducing apparatus according to claim 1, wherein said controller executes the processing of confirming whether or not said last recording position information in the management information read out from said recording medium and stored in said storage unit is matched to the last position of the recorded user data on said recording medium; said controller updating the last recording position information in the management information stored in said storage unit in case of non-matching.

4. The recording and/or reproducing apparatus according to claim 1, wherein said controller executes the processing of confirming whether or not said unrecorded area determined by said written/unwritten indicating information in the management information read out from said recording medium and stored in said storage unit is matched to said unrecorded area on said recording medium; said controller updating the written/unwritten indicating information in the management information stored in said storage unit in case of non-matching.

5. A recording and/or reproducing method for a recording medium in a write-once recording area of which allowing for writing data once the management information and the user data are recorded, and in which the written/unwritten indicating information indicating whether data has been written in each data unit in at least an area for recording said user data and the last recording position information indicating the last position of recording of the recorded user data, are recorded as said management information, said method comprising:

a step of reading out the management information from said recording medium for storage in a storage unit;

a step of updating the contents of the management information stored in said storage unit, responsive to execution of the data recording on said recording medium; and a management information recording step of recording the management information stored in said storage unit, on said recording medium, responsive to generation of an unrecorded area in a range up to a location on said recording medium indicated by said last recording position information of said management information updated in said updating step.

6. The recording and/or reproducing method according to claim 5, wherein said management information recording step is responsive to extinction of said unrecorded area in said range up to the location indicated by said last recording position information to cause said management information stored in said storage unit to be recorded on said recording medium.

7. The recording and/or reproducing method according to claim 5, further comprising:

a step of verifying whether or not said last recording position information in said management information read out from said recording medium and stored in said storage unit is matched to the last position of the recorded user data on said recording medium, and a matching step of updating said last recording position information in said management information stored in said storage unit in case said verifying step has verified non-matching.

8. The recording and/or reproducing method according to claim 5, further comprising:

a step of confirming whether or not said unrecorded area determined by said written/unwritten indicating information in the management information read out from said recording medium in said recording step and stored in said storage unit is matched to said unrecorded area on said recording medium; and a step of updating the written/unwritten indicating information in the management information stored in said storage unit in case said verifying step has verified non-matching.

* * * * *